(12) United States Patent
Verdonck

(10) Patent No.: US 8,398,199 B2
(45) Date of Patent: Mar. 19, 2013

(54) WHITE INKJET INK IMPROVED FOR DISPERSION STABILITY

(75) Inventor: Emiel Verdonck, Berlaar (BE)

(73) Assignee: Agfa Graphics NV, Mortsel (BE)

(*) Notice: Subject to any disclaimer, the term of this patent is extended or adjusted under 35 U.S.C. 154(b) by 281 days.

(21) Appl. No.: 12/739,016

(22) PCT Filed: Oct. 16, 2008

(86) PCT No.: PCT/EP2008/063948
§ 371 (c)(1),
(2), (4) Date: Apr. 21, 2010

(87) PCT Pub. No.: WO2009/053302
PCT Pub. Date: Apr. 30, 2009

(65) Prior Publication Data
US 2010/0302300 A1    Dec. 2, 2010

Related U.S. Application Data

(60) Provisional application No. 60/982,476, filed on Oct. 25, 2007.

(30) Foreign Application Priority Data

Oct. 24, 2007  (EP) .................................... 07119175

(51) Int. Cl.
*B41J 2/205*  (2006.01)
(52) U.S. Cl. ............... 347/15; 347/17; 347/100
(58) Field of Classification Search ............... 347/15, 347/17, 102, 100
See application file for complete search history.

(56) References Cited

U.S. PATENT DOCUMENTS

| 4,880,465 | A | 11/1989 | Loria et al. | |
|---|---|---|---|---|
| 6,902,249 | B2 * | 6/2005 | Suzuki et al. | ............... 347/15 |
| 2004/0113971 | A1 | 6/2004 | Nakajima | |
| 2004/0246319 | A1 * | 12/2004 | Ito et al. | ............... 347/100 |
| 2006/0155005 | A1 | 7/2006 | Kondo et al. | |
| 2007/0279470 | A1 * | 12/2007 | Arai | ............... 347/102 |

FOREIGN PATENT DOCUMENTS

| EP | 1 388 578 A1 | 2/2004 |
|---|---|---|
| EP | 1 726 441 A1 | 11/2006 |
| EP | 1 803 781 A1 | 7/2007 |
| EP | 1 818 373 A2 | 8/2007 |
| EP | 1 826 206 A1 | 8/2007 |
| JP | 2005-126585 * | 5/2005 |
| WO | 2007/035505 A1 | 3/2007 |

OTHER PUBLICATIONS

Official Communication issued in International Patent Application No. PCT/EP2008/063948, mailed on Jan. 20, 2009.

* cited by examiner

*Primary Examiner* — Lam S Nguyen
(74) *Attorney, Agent, or Firm* — Keating & Bennett, LLP

(57) ABSTRACT

An inkjet printing method includes the steps of
a) providing a white inkjet ink and at least one color inkjet ink to an inkjet printer; and
b) jetting the white inkjet ink at a higher temperature than the color inkjet ink onto an ink-receiver. The difference in jetting temperature between the white inkjet ink and the color inkjet ink is at least 5° C. Inkjet ink sets and inkjet printers are also disclosed.

20 Claims, No Drawings

WHITE INKJET INK IMPROVED FOR DISPERSION STABILITY

CROSS-REFERENCE TO RELATED APPLICATIONS

This application is a 371 National Stage Application of PCT/EP2008/063948, filed Oct. 16, 2008. This application claims the benefit of U.S. Provisional Application No. 60/982,476, filed Oct. 25, 2007, which is incorporated by reference herein in its entirety. In addition, this application claims the benefit of European Application No. 07119175.3, filed Oct. 24, 2007, which is also incorporated by reference herein in its entirety.

BACKGROUND OF THE INVENTION

1. Field of the Invention

The present invention relates to inkjet printing methods and inkjet ink sets using white inkjet ink.

2. Description of the Related Art

In inkjet printing, tiny drops of ink fluid are projected directly onto an ink-receiver surface without physical contact between the printing device and the ink-receiver. The printing device stores the printing data electronically and controls a mechanism for ejecting the drops image-wise. Printing is accomplished by moving a print head across the ink-receiver or vice versa or both.

When jetting the inkjet ink onto an ink-receiver, the ink typically includes a liquid vehicle and one or more solids, such as dyes or pigments and polymeric binders. It will be readily understood that the optimal composition of such ink is dependent on the printing method used and on the nature of the ink-receiver to be printed. The ink compositions can be roughly divided in:

water-based, the drying mechanism involving absorption, penetration and evaporation;
solvent-based, the drying primarily involving evaporation;
oil-based, the drying involving absorption and penetration;
hot melt or phase change, in which the ink is liquid at the ejection temperature but solid at room temperature and wherein drying is replaced by solidification; and
UV-curable, in which drying is replaced by polymerization.

It should be clear that the first three types of ink compositions are more suitable for a receiving medium that is more or less absorptive, whereas hot melt inks and UV-curable inks are usually printed on non-absorbent ink-receivers.

White inkjet inks are generally used for so-called "surface printing" or "backing printing" to form a reflection image on a transparent substrate. In surface printing, a white background is formed on a transparent substrate using a white ink and further thereon, a color image is printed, whereafter the formed final image is viewed from the printed face. In so-called backing printing, a color image is formed on a transparent substrate using color inks and then a white ink is applied onto the color inks, and the final formed image is observed through the transparent substrate. In a preferred embodiment the colour inkjet ink is jetted on partially cured white inkjet ink. If the white ink is only partially cured, an improved wettability of the colour ink on the white ink layer is observed. Partially curing immobilizes the ink on the substrate surface. A quick test for determining if the white inkjet ink is partially cured can be done by rubbing a finger or a cloth across the printed surface, whereby it is observed that ink can be smeared or smudged on the surface.

Pigments with a high refractive index, such as titanium dioxide, are used in the white ink in order to obtain a sufficient opacity of the printed layer. Sedimentation of these dense particles in a low viscosity fluid, such as an inkjet ink, is a real challenge for ink formulators. Problems of clogging of inkjet printhead nozzles and poor storage stability of the ink are direct consequences of sedimentation and aggregation of white pigments due to the difference in specific gravity between pigment particles and the liquid medium of the ink.

Various approaches have been used trying to overcome these problems. One approach is to improve the dispersibility. EP 1388578 A (DAINIPPON INK) discloses an ultraviolet-curable ink composition for inkjet recording including titanium oxide, a polymeric dispersant having a basic functional group, a photopolymerizable compound and a photopolymerization initiator, the titanium oxide is surface-treated with silica and alumina and the weight of the silica, which coexists with the titanium oxide, is larger than that of the alumina.

Another approach is designing particles which exhibit less sedimentation. U.S. Pat. No. 4,880,465 (VIDEOJET) discloses a non-pigmented white inkjet ink including hollow microspheres containing a central void region filled with a liquid capable of diffusing through the walls of the microspheres and have an inside diameter from about 0.1 to about 0.5 micron and an outside diameter from about 0.4 to about 1 micron. Sedimentation is drastically reduced but the opacity of such a printed white layer remains limited.

A third approach is the adaptation of the hardware involving an agitating device for reducing sedimentation, such as e.g. a stirrer in the supply vessel of the white ink. However it is complex and costly to foresee an agitating device in the printhead and the tubing from the supply vessel to the printhead.

EP 1803781 A1 (KONICA) discloses an active ray curable ink-jet ink set including colour inks and a white ink based on titanium dioxide.

WO 2007/035505 A1 (DU PONT) discloses an aqueous white ink including a polymerically dispersed titanium dioxide and a crosslinked polyurethane binder.

EP 1818373 A2 (FUJIFILM) discloses an inkjet ink composition including: a white pigment; a polymerizable compound; and a polymerization initiator wherein the white pigment includes at least one of inorganic hollow particles or inorganic-organic hybrid hollow particles.

It would be desirable to be able to print white layers of consistent quality on a wide variety of ink-receivers using a state-of-the-art inkjet printer not requiring any complex or costly adaptation of the printer, wherein sedimentation problems of the pigment in the white inkjet ink are strongly reduced or eliminated.

SUMMARY OF THE INVENTION

Preferred embodiments of the present invention provide inkjet ink sets and inkjet printing methods improved for sedimentation problems of the white inkjet ink.

Further preferred embodiments of the invention will become apparent from the description hereinafter.

DETAILED DESCRIPTION OF THE PREFERRED EMBODIMENTS $TiO_2$ is the white pigment of choice for a white inkjet ink primarily because its refractive index, which dictates its hiding power and thus opacity, is considerably higher than other white pigments (see Table 1).

TABLE 1

| White Pigment | Refractive Index | Density (g/cm³) |
|---|---|---|
| Rutile $TiO_2$ | 2.73 | 4.3 |
| Anatase $TiO_2$ | 2.55 | 3.9 |
| Zinc Oxide | 2.02 | 5.6 |
| White Lead | 1.94-2.09 | 5.5 |
| Lithopone | 1.84 | 4.3 |
| Baryte | 1.64 | 4.5 |
| Calcium carbonate | 1.63 | 2.8 |

It was found that sedimentation problems in inkjet printing could be strongly reduced by using higher concentrations of $TiO_2$, leading to higher viscosity and reducing the viscosity of the ink in the inkjet printer to a level that the inkjet ink became jettable by increasing the jetting temperature.

Preferred embodiments of the present invention have been realized an inkjet printing method as defined below.

Further advantages and embodiments of the present invention will become apparent from the following description.

DEFINITIONS

The term "colorant", as used in disclosing the present invention means dyes and pigments.

The term "dye", as used in disclosing the present invention means a colorant having a solubility of 10 mg/L or more in the medium in which it is applied and under the ambient conditions pertaining.

The term "pigment" is defined in DIN 55943, herein incorporated by reference, as a colouring agent that is practically insoluble in the application medium under the pertaining ambient conditions, hence having a solubility of less than 10 mg/L therein.

The term "C.I." is used in disclosing the present application as an abbreviation for Colour Index.

The term "UV" is used in disclosing the present invention as an abbreviation for ultraviolet radiation.

The term "ultraviolet radiation" as used in disclosing the present invention means electromagnetic radiation in the wavelength range of 100 to 400 nanometers.

The term "wt %" is used in disclosing the present invention as an abbreviation for % by weight based upon the total weight of the ink unless otherwise specified.

The term "actinic radiation" as used in disclosing the present invention means electromagnetic radiation capable of initiating photochemical reactions.

The term "Norrish Type I initiator" as used in disclosing the present invention, means an initiator which cleaves after excitation, yielding the initiating radical immediately.

The term "Norrish Type II initiator" as used in disclosing the present invention, means an initiator which in its excited state forms free radicals by hydrogen abstraction or electron extraction from a second compound that becomes the actual initiating free radical. The second compound is called co-initiator or polymerization synergist. Synergists are compounds having a carbon atom with at least one hydrogen atom in the α-position to a nitrogen atom.

The term "photo-acid generator" as used in disclosing the present invention means an initiator, which generates an acid or hemi-acid upon exposure to actinic radiation. A photo-acid generator is often also called a cationic initiator.

The term "thermal initiator" as used in disclosing the present invention means an initiator, which generates initiating species upon exposure to heat.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

Inkjet Printing Methods

The inkjet printing method according to a preferred embodiment of the present invention includes the steps of:
a) providing a white inkjet ink and at least one colour inkjet ink to an inkjet printer; and
b) jetting the white inkjet ink at a higher temperature than the colour inkjet ink onto an ink-receiver.

The printhead temperature control is used for reducing sedimentation of a pigment with a refractive index greater than 1.60 in a white inkjet ink.

The difference in jetting temperature between the white inkjet ink and the colour inkjet ink is preferably at least 5° C., more preferably at least 10° C. and most preferably at least 15° C.

The temperature of the white ink in the print head is preferably reduced when images are printed not requiring white ink or when the inkjet printer is not used for more than 24 hours.

In a preferred embodiment, the temperature of the white ink in the printhead is reduced while the printhead of the colour inkjet ink remains at its jetting temperature.

The inkjet printing method uses a colour inkjet ink set including at least one colour ink and a white ink. The colour inkjet ink set includes preferably at least three colour inkjet inks and also a black inkjet ink. Preferably the three colour inkjet inks are a cyan ink, a magenta ink and a yellow ink. Red, green and blue inks are also sometimes used as an inkjet ink set or added to a CMYK inkjet ink set.

The inkjet printing method may also use a so-called "multi-density" colour inkjet ink set, including colour inkjet inks of the same colour but a different colour density. For example, the colour inkjet ink set may include a "dark magenta" inkjet ink and a "light magenta" inkjet ink. In a preferred embodiment, the multi-density inkjet ink set includes dark and light colour inkjet inks for the colours magenta and cyan. Dark black and light black inks may also be present in a colour inkjet ink set. The inkjet ink set may include two, three, four or more black inks of different tone, a white ink and one or more colourless liquids. The latter inkjet ink set is capable of providing very detailed black and white images.

In one embodiment, the inkjet printing method uses a colour inkjet ink set including one or more colourless liquids. A colourless ink can, for example, be used to enhance the glossiness of the printed image or as a primer for improving the adhesion of the ink layers to the ink-receiver.

The adhesion may be influenced by using different polymerizable compounds, surfactants, binders and/or organic solvents. For example, it is known that the adhesion of radiation curable inks is promoted on polyvinyl chloride substrates when one or more monomers are used that are suitable for the swelling of the PVC substrate and which are selected from the group consisting of tetrahydrofurfuryl acrylate, 1,6-hexanediol diacrylate and N-vinyl caprolactam. However, adhesion on polycarbonate substrates is promoted when one or more monomers are used that are suitable for the swelling of the polycarbonate substrate and which are selected from the group consisting of propoxylated neopentyl glycol diacrylate, 2-phenoxylethyl acrylate, 2-(2-ethoxyethoxy)ethyl acrylate and polyethyleneglycol diacrylate. With the radiation curable inkjet printing method according to a preferred embodiment of the present invention, it is not necessary to make a "best possible" mixture of monomers suitable for both the swelling of polyvinyl chloride substrates and polycarbonate substrates. Instead, a dedicated monomer mixture can be prepared consisting predominantly of monomers, for example, for swelling polyvinyl chloride substrates if such a substrate is fed into the printer.

Inkjet Printer

Industrial inkjet printers generally include an ink supply system for supplying ink to an inkjet print head. Inkjet print heads produce drops either continuously or on demand. "Continuously" means that a continuous stream of ink drops is created, e.g. by pressurizing the ink supply. "On demand" differs from "continuous" in that ink drops are only ejected from a print head by manipulation of a physical process to momentarily overcome surface tension forces that keep the ink in the print head. The ink is held in a nozzle, forming a meniscus. The ink remains in place unless some other force overcomes the surface tension forces that are inherent in the liquid. The most common practice is to suddenly raise the pressure on the ink, ejecting it from the nozzle. One category of drop-on-demand inkjet print heads uses the physical phenomenon of electrostriction, a change in transducer dimension in response to an applied electric field. Electrostriction is strongest in piezoelectric materials and hence these print heads are referred to as piezoelectric print heads. The very small dimensional change of piezoelectric material is harnessed over a large area to generate a volume change that is large enough to squeeze out a drop of ink from a small chamber. A piezoelectric print head includes a multitude of small ink chambers, arranged in an array, each having an individual nozzle and a percentage of transformable wall area to create the volume changes required to eject an ink drop from the nozzle, in accordance with electrostriction principles.

In a preferred embodiment the inkjet printer is a drop-on-demand inkjet printing system having piezoelectric print heads for delivering droplets of a ink to an ink-receiver.

The inkjet ink is supplied to the ink ejecting chambers of a print head by an ink supply system that first conditions the ink in order to obtain smooth operation of the inkjet print head. Conditioning includes, for example, degassing of the ink and controlling the back-pressure at the nozzle.

It is known that the presence of air bubbles in the ink chamber of a piezoelectric print head often causes operational failure of the print head. If air is present in the ink chamber, intended pressure changes resulting from piezoelectric deformation of part of the ink chamber walls will be absorbed by the air, leaving the ink pressure unaffected. The surface tension force of the ink in the nozzle maintains the meniscus and no drops will be ejected from the ink chamber. At the frequencies at which piezoelectric transducers in piezoelectric print head are operated, i.e. in the kHz to MHz range, not only air bubbles but also dissolved air in the ink can cause operation failure as described above. In the prior art, concepts have been disclosed to avoid air bubbles in the ink chamber by creating an air trap upstream the ink chamber, i.e. prior to the ink entering the ink chamber. Solutions have been proposed in EP 714779 A (CANON) and U.S. Pat. No. 4,929,963 (HP) in the form of air buffers or gas separators that allow air bubbles to rise and evacuate from the ink in an intermediate tank before the ink is supplied to the print head.

A second point of attention in ink supply systems is the pressure at the nozzle, which is critical to a well-tuned and good operating print head. Inkjet print heads operate best at a slightly negative nozzle pressure or back-pressure. In practice this is often achieved by maintaining a height difference between the free ink surface in a vented ink supply tank and the meniscus in the nozzle. That is, the free ink surface in the vented supply tank is maintained gravimetrically a couple of centimeters below the level of the meniscus in the nozzle. This height difference established a hydrostatic pressure difference to control the back-pressure at the nozzle. In reciprocating print head configurations the ink supply tank is located off axis, i.e. not scanning, because otherwise the lowered position of ink supply tank versus the print head would interfere with the printing medium transport path. Flexible tubing is used to connect the off axis ink supply tank with the on axis print head, as disclosed in for example U.S. Pat. No. 4,929,963 (HP). During acceleration and deceleration of the print head, pressure waves are created in the tubes that may significantly disturb the pressure balance at the meniscus and may lead to weeping of the nozzle in the case of a decrease in negative pressure, or breaking of the meniscus in the case of an increase in negative pressure and taking air into the ink channel. Many approaches have been proposed to control the back-pressure in reciprocating print head applications. A back-pressure regulation mechanism in the form of pressure buffers or dampers mounted together with the print head on the reciprocating carriage are disclosed in EP 1120257 A (SEIKO EPSON) and U.S. Pat. No. 6,485,137 (APRION DIGITAL). For accelerations and decelerations of the carriage above 1G the response time of these devices is insufficient. In EP 1142713 A (SEIKO EPSON) a vented subtank is used. The subtank serves as a local ink reservoir near the print head and is being filled intermittently from a main tank located off axis. The solution provides a better control of the nozzle back-pressure by maintaining a local hydrostatic pressure difference between the free ink surface of the vented subtank and the meniscus.

The inkjet printer according to a preferred embodiment of the present invention includes a temperature control device to control the temperature independently for a white inkjet ink printhead and one or more colour inkjet ink printheads. In a more preferred embodiment, the inkjet printer also includes a back-pressure control device to control the back-pressure independently for a white inkjet ink printhead and one or more colour inkjet ink printheads Inkjet Ink-Receivers The ink-receiver suitable for the inkjet printing method according to a preferred embodiment of the present invention is not restricted to any specific type and can be transparent, translucent or opaque. The ink-receiver may be coloured or metallized. It can be a temporary substrate, e.g. for transferring an image to another substrate after printing. Applications such as 3D-printing, direct printing on wooden doors or panels and ceramics are also included.

Aqueous inks are generally printed on absorbing ink-receivers. Solvent based inkjet inks and radiation curable inks can also be printed on ink-receivers substantially non-absorbing for an aqueous solution. For example, standard paper is an absorbing ink-receiver. On the other hand, a resin-coated paper, e.g. polyethylene-coated paper or polypropylene-coated paper, is usually substantially non-absorbing.

The ink-receiver may include a support with at least one ink-receiving layer. The ink-receiving layer may consist of just one single layer, or alternatively it may be composed of two, three or more layers. The ink-receiving layer may contain one or more polymeric binders and optionally fillers. The ink-receiving layer, and an optional auxiliary layer, such as a backing layer for anti-curl and/or adhesive purposes, may further contain well-known conventional ingredients, such as surfactants serving as coating aids, cross-linking agents, plasticizers, cationic substances acting as mordant, light-stabilizers, pH adjusters, anti-static agents, biocides, lubricants, whitening agents and matting agents.

The ink-receiving layer and the optional auxiliary layer(s) may be cross-linked to a certain degree to provide such desired features as waterfastness and non-blocking characteristics. The cross-linking is also useful in providing abrasion resistance and resistance to the formation of fingerprints on the element as a result of handling.

Supports suitable for the ink-receiving layers are also suitable ink-receivers for solvent based inkjet inks or radiation curable inks and include polymeric substrates such as cellulose acetate propionate, cellulose acetate butyrate, polyesters such as polyethylene terephthalate (PET) and polyethylene naphthalate (PEN); oriented polystyrene (OPS); oriented nylon (ONy); polypropylene (PP), oriented polypropylene (OPP); polyvinyl chloride (PVC); and various polyamides, polycarbonates, polyimides, polyolefins, poly(vinylacetals), polyethers and polysulfonamides, opaque white polyesters and extrusion blends of polyethylene terephthalate and polypropylene. Acrylic resins, phenol resins, glass and metals may also be used as an ink-receiver. Other suitable ink-receiver materials can be found in Modern Approaches to Wettability: Theory and Applications. Edited by SCHRADER, Malcolm E., et al. New York: Plenum Press, 1992. ISBN 0306439859.

The ink-receiver may also incorporate mineral particles as fillers, such as e.g. PET containing $CaCO_3$, PET containing $TiO_2$, amorphous PET (APET) and glycolized PET (PETG).

The ink-receiver may be provided with a self-adhesive backlayer. Examples of self-adhesive PVC ink-receivers include MPI™ vinyls from AVERY-DENNISON, DIGITAL™ vinyls from METAMARK, MULTI-FIX™ digital white vinyls from MULTI-FIX and GRAFIPRINT™ vinyls from GRAFITYP.

Polyester film substrates and especially polyethylene terephthalate are preferred for certain applications, particularly types with excellent dimensional stability. When such a polyester substrate is used as the ink-receiver, a subbing layer may be employed to improve the bonding of the jetted ink layer to the substrate, if it constitutes together with the unsubbed substrate a substantially non-absorbing ink-receiver. Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers. Stabilizers, leveling additives, matting agents, adjusting agents for physical film properties such as waxes, may also be added to the subbing layer as required.

The ink-receiver may also be made from an inorganic material, such as a metal oxide or a metal (e.g. aluminium and steel).

Other suitable ink-receivers may be selected from the group consisting of cardboard, wood, composite boards, coated plastic, canvas, textile, glasses, plant fibre products, leather, magnetic materials and ceramics.

Inkjet Ink Sets

The colour inkjet ink set according to a preferred embodiment of the present invention includes a white ink containing a pigment with a refractive index greater than 1.60 and at least one colour inkjet ink wherein the viscosity of the white inkjet ink is at least 4 mPa·s, more preferably at least 6 mPa·s, and most preferably at least 8 mPa·s, greater than the viscosity of the colour inkjet ink wherein the viscosity is measured at 40° C. with a Brookfield DV-II+Pro at 12 rotations per minute.

A colour inkjet ink set according to a preferred embodiment of present invention includes preferably a white inkjet ink that is curable by radiation or electron beam. In a preferred embodiment the colour inks are also curable by radiation or electron beam.

The inkjet inks in a colour inkjet ink set according to a preferred embodiment of the present invention are preferably non-aqueous inkjet inks. In a non-aqueous inkjet ink the components are present in a dispersion medium which is a non-aqueous liquid at jetting temperature.

The term "non-aqueous liquid" refers to a liquid carrier which should contain no water. However sometimes a small amount, generally less than 5 wt % of water based on the total weight of the ink, can be present. This water was not intentionally added but came into the formulation via other components as a contamination, such as for example polar organic solvents. Higher amounts of water than 5 wt % tend to make the non-aqueous inkjet inks instable, preferably the water content is less than 1 wt % based on the total weight dispersion medium and most preferably no water at all is present.

The inkjet inks of a colour inkjet ink set according to a preferred embodiment of the present invention may further also contain at least one surfactant.

The inkjet inks of a colour inkjet ink set according to a preferred embodiment of the present invention may contain at least one humectant to prevent the clogging of the nozzle, due to its ability to slow down the evaporation rate of ink.

The pigmented inkjet inks according to a preferred embodiment of the present invention may contain at least one dispersion synergist. A mixture of dispersion synergists may be used to further improve dispersion stability The inkjet inks of an ink set according to a preferred embodiment of the present invention is preferably an inkjet ink selected from the group consisting of an organic solvent based, an oil based and a curable inkjet ink. The curable inkjet ink is preferably radiation curable.

The viscosity of the inkjet ink is preferably smaller than 100 mPa·s at 30° C. and at a shear rate of $100\ s^{-1}$. The viscosity of the inkjet ink is preferably smaller than 30 mPa·s, more preferably smaller than 15 mPa·s, and most preferably between 2 and 10 mPa·s at a shear rate of $100\ s^{-1}$ and a jetting temperature between 10 and 70° C.

The curable inkjet ink may contain as dispersion medium monomers, oligomers and/or prepolymers possessing different degrees of functionality. A mixture including combinations of mono-, di-, tri- and/or higher functionality monomers, oligomers or prepolymers may be used. A catalyst called an initiator for initiating the polymerization reaction may be included in the curable inkjet ink. The initiator can be a thermal initiator, but is preferably a photo-initiator. The photo-initiator requires less energy to activate than the monomers, oligomers and/or prepolymers to form the polymer. The photo-initiator suitable for use in the curable pigment dispersion may be a Norrish type I initiator, a Norrish type II initiator or a photo-acid generator.

The curable inkjet inks of an ink set according to a preferred embodiment of the present invention may further also contain at least one inhibitor.

In the most preferred embodiment, the ink set includes a cyan, magenta, yellow and black inkjet ink, i.e. a CMYK inkjet ink set.

A CMYK inkjet ink set may also be extended with one or more extra inks such as red, green, blue and orange to further enlarge the colour gamut of the image. The CMYK ink set may also be extended by the combination of full density and light density inks of both colour inks and/or black inks to improve the image quality by lowered graininess.

In another embodiment, the inkjet printing method uses a so-called "multi-density" inkjet ink set including colour inkjet inks of the same colour but a different colour density. For example, the ink set may include a "dark magenta" inkjet ink and a "light magenta" inkjet ink. In another preferred embodiment the multi-density inkjet ink set includes dark and light inkjet inks for the colours magenta and cyan. Dark black and light black inks may also be present in an inkjet ink set. The inkjet ink set may include two, three, four or more black inks of different tone, a white ink and one or more colourless liquids. The latter inkjet ink set is capable of providing very detailed black and white images.

White Inkjet Ink

The white inkjet ink includes a pigment with a refractive index greater than 1.60, preferably greater than 2.00, more preferably greater than 2.50 and most preferably greater than 2.60. Suitable pigments are given by Table 2. The white pigments may be employed singly or in combination. Preferably titanium dioxide is used for the pigment with a refractive index greater than 1.60.

TABLE 2

| C.I. Number | Chemical name | CAS RN |
|---|---|---|
| Pigment white 1 | Lead hydroxide carbonate | 1319-46-6 |
| Pigment white 3 | Lead sulfate | 7446-14-2 |
| Pigment white 4 | Zinc oxide | 1314-13-2 |
| Pigment white 5 | Lithopone | 1345-05-7 |
| Pigment white 6 | Titanium dioxide | 13463-67-7 |
| Pigment white 7 | Zinc sulfide | 1314-98-3 |
| Pigment white 10 | Barium carbonate | 513-77-9 |
| Pigment white 11 | Antimony trioxide | 1309-64-4 |
| Pigment white 12 | Zirconium oxide | 1314-23-4 |
| Pigment white 14 | Bismuth oxychloride | 7787-59-9 |
| Pigment white 17 | Bismuth subnitrate | 1304-85-4 |
| Pigment white 18 | Calcium carbonate | 471-34-1 |
| Pigment white 19 | Kaolin | 1332-58-7 |
| Pigment white 21 | Barium sulfate | 7727-43-7 |
| Pigment white 24 | Aluminum hydroxide | 21645-51-2 |
| Pigment white 25 | Calcium sulfate | 7778-18-9 |
| Pigment white 27 | Silicon dioxide | 7631-86-9 |
| Pigment white 28 | Calcium metasilicate | 10101-39-0 |
| Pigment white 32 | Zinc phosphate cement | 7779-90-0 |

Titanium oxide occurs in the crystalline forms of anatase type, rutile type and brookite type. The anatase type has a relatively low density and is easily ground into fine particles, while the rutile type has a relatively high refractive index, exhibiting a high covering power. Either one of these is usable in preferred embodiments of the invention. It is preferred to make the most possible use of characteristics and to make selections according to the use thereof. The use of the anatase type having a low density and a small particle size can achieve superior dispersion stability, ink storage stability and ejectability. At least two different crystalline forms may be used in combination. The combined use of the anatase type and the rutile type which exhibits a high coloring power can reduce the total amount of titanium oxide, leading to improved storage stability and ejection performance of ink.

For surface treatment of the titanium oxide, an aqueous treatment or a gas phase treatment is applied, and an alumina-silica treating agent is usually employed. Untreated-, alumina treated- or alumina-silica treated-titanium oxide are employable.

The numeric average particle diameter of the titanium oxide is preferably from 150 to 500 nm, more preferably from 200 to 400 nm, and most preferably from 230 to 350 nm. Sufficient hiding power cannot be obtained when the average diameter is less than 50 nm, and the storage ability and the jet-out suitability of the ink tend to be degraded when the average diameter exceeds 500 nm.

The white inkjet ink is preferably curable by radiation or electron beam. For improving adhesion on specific substrates, the white inkjet ink preferably includes a polymerizable compound selected from the group consisting of isobornylacrylate, phenoxyethyl acrylate, tetrahydrofurfuryl acrylate, 2-(2-vinyloxyethoxy)ethyl(meth)acrylate and N-vinylcaprolactam.

The white inkjet ink preferably includes the white pigment in an amount of at least 26 wt %, more preferably 30 wt % and most preferably 40 wt % of white pigment based upon the total weight of the white inkjet ink.

Colour Inkjet Inks

The colour inkjet inks of a colour inkjet ink set according to a preferred embodiment of the present invention contain at least one colorant. Colorants used in the inkjet inks may be pigments, dyes or a combination thereof. Organic and/or inorganic pigments may be used. The colour inkjet inks of the inkjet ink set according to a preferred embodiment of the present invention preferably contain a pigment as colorant. If the colorant is not a self-dispersible pigment, the inkjet inks preferably also contain a dispersant, more preferably a polymeric dispersant.

The radiation curable inkjet inks or solvent based inkjet inks preferably contain pigments as colorants.

The pigments in the colour inkjet inks may be black, cyan, magenta, yellow, red, orange, violet, blue, green, brown, mixtures thereof, and the like.

The colour pigment may be chosen from those disclosed by HERBST, Willy, et al. Industrial Organic Pigments, Production, Properties, Applications. 3rd edition. Wiley—VCH, 2004. ISBN 3527305769.

Particular preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 180, 185 and 213.

Particular preferred pigments are C.I. Pigment Yellow 120, 151, 154, 175, 180, 181 and 194.

The most preferred yellow pigments are C.I. Pigment Yellow 120, 139, 150 155 and 213.

Particular preferred pigments are C.I. Pigment Red 17, 22, 23, 41, 48:1, 48:2, 49:1, 49:2, 52:1, 57:1, 81:1, 81:3, 88, 112, 122, 144, 146, 149, 169, 170, 175, 176, 184, 185, 188, 202, 206, 207, 210, 216, 221, 248, 251, 254, 255, 264, 270 and 272. For manufacturing decorative laminates, the most preferred are C.I. Pigment Red 254 and C.I. Pigment Red 266. For other non-aqueous inkjet applications the most preferred pigments are C.I. Pigment Red 122 and C.I. Pigment Violet 19.

Particular preferred pigments are C.I. Pigment Violet 1, 2, 19, 23, 32, 37 and 39.

Particular preferred pigments are C.I. Pigment Blue 15:1, 15:2, 15:3, 15:4, 15:6, 16, 56, 61 and (bridged) aluminium phthalocyanine pigments.

Particular preferred pigments are C.I. Pigment Orange 5, 13, 16, 34, 40, 43, 59, 66, 67, 69, 71 and 73.

Particular preferred pigments are C.I. Pigment Green 7 and 36.

Particular preferred pigments are C.I. Pigment Brown 6 and 7.

Suitable pigments include mixed crystals of the above particular preferred pigments. A commercially available example is CINQUASIA™ Magenta RT-355-D from Ciba Specialty Chemicals.

Carbon black is preferred as a pigment for the black inkjet ink. Suitable black pigment materials include carbon blacks such as Pigment Black 7 (e.g. Carbon Black MAB™ from MITSUBISHI CHEMICAL), REGAL™ 400R, MOGUL™ L, ELFTEX™ 320 from CABOT Co., or Carbon Black FW18, Special Black 250, Special Black 350, Special Black 550, PRINTEX™ 25, PRINTEX™ 35, PRINTEX™ 55, PRINTEX™ 90, PRINTEX™ 150T from DEGUSSA. Additional examples of suitable pigments are disclosed in U.S. Pat. No. 5,389,133 (XEROX).

It is also possible to make mixtures of pigments in the colour inkjet inks. For some applications, a neutral black inkjet ink is preferred and can be obtained, for example, by mixing a black pigment and a cyan pigment into the ink. The inkjet application may also require one or more spot colours, for example for packaging inkjet printing or textile inkjet printing. Silver and gold are often desired colours for inkjet poster printing and point-of-sales displays.

Also non-organic pigments may be present in the colour inkjet inks. Particular preferred pigments are C.I. Pigment Metal 1, 2 and 3. Illustrative examples of the inorganic pigments include red iron oxide (III), cadmium red, ultramarine blue, prussian blue, chromium oxide green, cobalt green, amber, titanium black and synthetic iron black.

Generally pigments are stabilized in the dispersion medium by dispersing agents, such as polymeric dispersants or surfactants. However, the surface of the pigments can be modified to obtain so-called "self-dispersible" or "self-dispersing" pigments, i.e. pigments that are dispersible in the dispersion medium without dispersants.

Pigment particles in inkjet ink should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm.

The pigment is preferably used in the pigment dispersion used for preparing the inkjet inks in an amount of 10 to 40 wt %, preferably 15 to 30 wt % based on the total weight of the pigment dispersion. In the inkjet ink the pigment is preferably used in an amount of 0.1 to 20 wt %, preferably 1 to 10 wt % based on the total weight of the inkjet ink.

Dyes suitable for the colour inkjet inks in the ink set according to a preferred embodiment of the present invention include direct dyes, acidic dyes, basic dyes and reactive dyes.

Suitable direct dyes for the colour inkjet inks include:
C.I. Direct Yellow 1, 4, 8, 11, 12, 24, 26, 27, 28, 33, 39, 44, 50, 58, 85, 86, 100, 110, 120, 132, 142, and 144
C.I. Direct Red 1, 2, 4, 9, 11, 134, 17, 20, 23, 24, 28, 31, 33, 37, 39, 44, 47, 48, 51, 62, 63, 75, 79, 80, 81, 83, 89, 90, 94, 95, 99, 220, 224, 227 and 343
C.I. Direct Blue 1, 2, 6, 8, 15, 22, 25, 71, 76, 78, 80, 86, 87, 90, 98, 106, 108, 120, 123, 163, 165, 192, 193, 194, 195, 196, 199, 200, 201, 202, 203, 207, 236, and 237
C.I. Direct Black 2, 3, 7, 17, 19, 22, 32, 38, 51, 56, 62, 71, 74, 75, 77, 105, 108, 112, 117, 154 and 195

Suitable acidic dyes for the colour inkjet inks include:
C.I. Acid Yellow 2, 3, 7, 17, 19, 23, 25, 20, 38, 42, 49, 59, 61, 72, and 99
C.I. Acid Orange 56 and 64
C.I. Acid Red 1, 8, 14, 18, 26, 32, 37, 42, 52, 57, 72, 74, 80, 87, 115, 119, 131, 133, 134, 143, 154, 186, 249, 254, and 256
C.I. Acid Violet 11, 34, and 75
C.I. Acid Blue 1, 7, 9, 29, 87, 126, 138, 171, 175, 183, 234, 236, and 249
C.I. Acid Green 9, 12, 19, 27, and 41
C.I. Acid Black 1, 2, 7, 24, 26, 48, 52, 58, 60, 94, 107, 109, 110, 119, 131, and 155

Suitable reactive dyes for the colour inkjet inks include:
C.I. Reactive Yellow 1, 2, 3, 14, 15, 17, 37, 42, 76, 95, 168, and 175
C.I. Reactive Red 2, 6, 11, 21, 22, 23, 24, 33, 45, 111, 112, 114, 180, 218, 226, 228, and 235
C.I. Reactive Blue 7, 14, 15, 18, 19, 21, 25, 38, 49, 72, 77, 176, 203, 220, 230, and 235
C.I. Reactive Orange 5, 12, 13, 35, and 95
C.I. Reactive Brown 7, 11, 33, 37, and 46
C.I. Reactive Green 8 and 19
C.I. Reactive Violet 2, 4, 6, 8, 21, 22, and 25
C.I. Reactive Black 5, 8, 31, and 39

Suitable basic dyes for the colour inkjet inks include:
C.I. Basic Yellow 11, 14, 21, and 32
C.I. Basic Red 1, 2, 9, 12, and 13
C.I. Basic Violet 3, 7, and 14
C.I. Basic Blue 3, 9, 24, and 25

If the colour inkjet ink contains water, dyes can only manifest the ideal colour in an appropriate range of pH value. Therefore, the inkjet ink preferably further includes a pH adjuster.

Suitable pH adjusters include NaOH, KOH, NEt$_3$, NH$_3$, HCl, HNO$_3$, H$_2$SO$_4$ and (poly)alkanolamines such as triethanolamine and 2-amino-2-methyl-1-propaniol. Preferred pH adjusters are NaOH and H$_2$SO$_4$.

The dyes are used in the colour inkjet inks in an amount of 0.1 to 30 wt %, preferably 1 to 20 wt % based on the total weight of the inkjet ink.

In a specific embodiment the colorant is a fluorescent colorant used to introduce security features. Suitable examples of a fluorescent colorant include TINOPAL™ grades such as TINOPAL™ SFD, UVITEX™ grades such as UVITEX™ NFW and UVITEX™ OB, all available from CIBA SPECIALTY CHEMICALS; LEUKOPHOR™ grades from CLARIANT and BLANCOPHOR™ grades such as BLANCOPHOR™ REU and BLANCOPHOR™ BSU from BAYER.

Dispersants

The dispersant is preferably a polymeric dispersant. Typical polymeric dispersants are copolymers of two monomers but may contain three, four, five or even more monomers. The properties of polymeric dispersants depend on both the nature of the monomers and their distribution in the polymer. Suitable copolymeric dispersants have the following polymer compositions:
statistically polymerized monomers (e.g. monomers A and B polymerized into ABBAABAB);
alternating polymerized monomers (e.g. monomers A and B polymerized into ABABABAB);
gradient (tapered) polymerized monomers (e.g. monomers A and B polymerized into AAABAABBABBB);
block copolymers (e.g. monomers A and B polymerized into AAAAABBBBBB) wherein the block length of each of the blocks (2, 3, 4, 5 or even more) is important for the dispersion capability of the polymeric dispersant;
graft copolymers (graft copolymers consist of a polymeric backbone with polymeric side chains attached to the backbone); and
mixed forms of these polymers, e.g. blocky gradient copolymers.

Polymeric dispersants may have different polymer architecture including linear, comb/branched, star, dendritic (including dendrimers and hyperbranched polymers). A general review on the architecture of polymers is given by ODIAN, George, Principles of Polymerization, 4th edition, Wiley-Interscience, 2004, p. 1-18.

Comb/branched polymers have side branches of linked monomer molecules protruding from various central branch points along the main polymer chain (at least 3 branch points).

Star polymers are branched polymers in which three or more either similar or different linear homopolymers or copolymers are linked together to a single core.

Dendritic polymers include the classes of dendrimers and hyperbranched polymers. In dendrimers, with well-defined mono-disperse structures, all branch points are used (multi-step synthesis), while hyperbranched polymers have a plurality of branch points and multifunctional branches that lead to further branching with polymer growth (one-step polymerization process).

Suitable polymeric dispersants may be prepared via addition or condensation type polymerizations. Polymerization methods include those described by ODIAN, George, Principles of Polymerization, 4th edition, Wiley-Interscience, 2004, p. 39-606.

Addition polymerization methods include free radical polymerization (FRP) and controlled polymerization techniques. Suitable controlled radical polymerization methods include:

RAFT: reversible addition-fragmentation chain transfer;
ATRP: atom transfer radical polymerization
MADIX: reversible addition-fragmentation chain transfer process, using a transfer active xanthate;
Catalytic chain transfer (e.g. using cobalt complexes);
Nitroxide (e.g. TEMPO) mediated polymerizations;
Other suitable controlled polymerization methods include:
GTP: group transfer polymerization;
Living cationic (ring-opening) polymerizations;
Anionic co-ordination insertion ring-opening polymerization; and
Living anionic (ring-opening) polymerization.

Reversible addition-fragmentation transfer (RAFT): controlled polymerization occurs via rapid chain transfer between growing polymer radicals and dormant polymer chains. A review article on RAFT synthesis of dispersants with different polymeric geometry is given in QUINN J. F. et al., Facile Synthesis of comb, star, and graft polymers via reversible addition-fragmentation chain transfer (RAFT) polymerization, Journal of Polymer Science, Part A: Polymer Chemistry, Vol. 40, 2956-2966, 2002.

Group transfer polymerization (GTP): the method of GTP used for synthesis of AB block copolymers is disclosed by SPINELLI, Harry J, GTP and its use in water based pigment dispersants and emulsion stabilisers, Proc. of 20th Int. Conf. Org. Coat. Sci. Technol., New Platz, N.Y., State Univ. N.Y., Inst. Mater. Sci. p. 511-518.

The synthesis of dendritic polymers is described in the literature. The synthesis of dendrimers in NEWCOME, G. R., et al. Dendritic Molecules: Concepts, Synthesis, Perspectives. VCH: WEINHEIM, 2001. Hyperbranching polymerization is described by BURCHARD, W. Solution properties of branched macromolecules. *Advances in Polymer Science.* 1999, vol. 143, no. II, p. 113-194. Hyperbranched materials can be obtained by polyfunctional polycondensation as disclosed by FLORY, P. J. Molecular size distribution in three-dimensional polymers. VI. Branched polymer containing A-R-Bf-1-type units. *Journal of the American Chemical Society.* 1952, vol. 74, p. 2718-1723.

Living cationic polymerizations is e.g. used for the synthesis of polyvinyl ethers as disclosed in WO 2005/012444 (CANON), US 20050197424 (CANON) and US 20050176846 (CANON). Anionic co-ordination ring-opening polymerization is e.g. used for the synthesis of polyesters based on lactones. Living anionic ring-opening polymerization is e.g. used for the synthesis of polyethylene oxide macromonomers.

Free radical Polymerization (FRP) proceeds via a chain mechanism, which basically consists of four different types of reactions involving free radicals: (1) radical generation from non-radical species (initiation), (2) radical addition to a substituted alkene (propagation), (3) atom transfer and atom abstraction reactions (chain transfer and termination by disproportionation), and (4) radical-radical recombination reactions (termination by combination).

Polymeric dispersants having several of the above polymer compositions are disclosed in U.S. Pat. No. 6,022,908 (HP), U.S. Pat. No. 5,302,197 (DU PONT) and U.S. Pat. No. 6,528,557 (XEROX).

Suitable statistical copolymeric dispersants are disclosed in U.S. Pat. No. 5,648,405 (DU PONT), U.S. Pat. No. 6,245,832 (FUJI XEROX), U.S. Pat. No. 6,262,207 (3M), US 20050004262 (KAO) and U.S. Pat. No. 6,852,777 (KAO).

Suitable alternating copolymeric dispersants are described in US 20030017271 (AKZO NOBEL).

Suitable block copolymeric dispersants have been described in numerous patents, especially block copolymeric dispersants containing hydrophobic and hydrophilic blocks. For example, U.S. Pat. No. 5,859,113 (DU PONT) discloses AB block copolymers, U.S. Pat. No. 6,413,306 (DU PONT) discloses ABC block copolymers.

Suitable graft copolymeric dispersants are described in CA 2157361 (DU PONT) (hydrophobic polymeric backbone and hydrophilic side chains); other graft copolymeric dispersants are disclosed in U.S. Pat. No. 6,652,634 (LEXMARK), U.S. Pat. No. 6,521,715 (DU PONT).

Suitable branched copolymeric dispersants are described U.S. Pat. No. 6,005,023 (DU PONT), U.S. Pat. No. 6,031,019 (KAO), U.S. Pat. No. 6,127,453 (KODAK).

Suitable dendritic copolymeric dispersants are described in e.g. U.S. Pat. No. 6,518,370 (3M), U.S. Pat. No. 6,258,896 (3M), US 2004102541 (LEXMARK), U.S. Pat. No. 6,649,138 (QUANTUM DOT), US 2002256230 (BASF), EP 1351759 A (EFKA ADDITIVES) and EP 1295919 A (KODAK).

Suitable designs of polymeric dispersants for inkjet inks are disclosed in SPINELLI, Harry J., Polymeric Dispersants in Inkjet technology, *Advanced Materials,* 1998, Vol. 10, no. 15, p. 1215-1218.

The monomers and/or oligomers used to prepare the polymeric dispersant can be any monomer and/or oligomer found in the Polymer Handbook Vol. 1+2, 4th edition, edited by J. BRANDRUP et al., Wiley-Interscience, 1999.

Polymers useful as pigment dispersants include naturally occurring polymers, and specific examples thereof include: proteins, such as glue, gelatine, casein, and albumin; naturally occurring rubbers, such as gum arabic and tragacanth; glucosides such as saponin; alginic acid and alginic acid derivatives, such as propylene glycol alginate; and cellulose derivatives, such as methyl cellulose, carboxymethyl cellulose and ethylhydroxy cellulose; wool and silk, and synthetic polymers.

Suitable examples of monomers for synthesising polymeric dispersants include: acrylic acid, methacrylic acid, maleic acid (or there salts), maleic anhydride, alkyl(meth) acrylates (linear, branched and cycloalkyl) such as methyl (meth)acrylate, n-butyl(meth)acrylate, tert-butyl(meth)acrylate, cyclohexyl(meth)acrylate, and 2-ethylhexyl(meth) acrylate; aryl(meth)acrylates such as benzyl(meth)acrylate, and phenyl(meth)acrylate; hydroxyalkyl(meth)acrylates such as hydroxyethyl(meth)acrylate, and hydroxypropyl (meth)acrylate; (meth)acrylates with other types of functionalities (e.g. oxiranes, amino, fluoro, polyethylene oxide, phosphate substituted) such as glycidyl(meth)acrylate, dimethylaminoethyl(meth)acrylate, trifluoroethyl acrylate, methoxypolyethyleneglycol(meth)acrylate, and tripropyleneglycol(meth)acrylate phosphate; allyl derivatives such as allyl glycidyl ether; styrenics such as styrene, 4-methylstyrene, 4-hydroxystyrene, 4-acetostyrene, and styrene sulfonic acid; (meth)acrylonitrile; (meth)acrylamides (including N-mono and N,N-disubstituted) such as N-benzyl(meth)acrylamide; maleimides such as N-phenyl maleimide; vinyl derivatives such as vinyl alcohol, vinylcaprolactam, vinylpyrrolidone, vinylimidazole, vinylnapthalene, and vinyl halides; vinylethers such as vinylmethyl ether; vinylesters of carboxylic acids such as vinylacetate, vinylbutyrate, and vinyl benzoate. Typical condensation type polymers include polyurethanes, polyamides, polycarbonates, polyethers, polyureas, polyimines, polyimides, polyketones, polyester, polysiloxane, phenol-formaldehyde, urea-formaldehyde, melamine-formaldehyde, polysulfide, polyacetal or combinations thereof.

Suitable copolymeric dispersants are acrylic acid/acrylonitrile copolymer, vinyl acetate/acrylic ester copolymer, acrylic acid/acrylic ester copolymer, styrene/acrylic acid copolymer, styrene/methacrylic acid copolymer, styrene/methacrylic acid/acrylic ester copolymer, styrene/α-methylstyrene/acrylic acid copolymer, styrene/α-methylstyrene/acrylic acid/acrylic ester copolymer, styrene/maleic acid copolymer, styrene/maleic anhydride copolymer, vinylnaphthalene/acrylic acid copolymer, vinylnapthalene/maleic acid copolymer, vinyl acetate/ethylene copolymer, vinyl acetate/fatty acid/ethylene copolymer, vinyl acetate/maleic ester copolymer, vinyl acetate/crotonic acid copolymer, vinyl acetate/acrylic acid copolymer.

Suitable chemistries of copolymeric dispersants also include:
  Copolymers which are the product of a condensation process of poly(ethylene imine) with a carboxylic acid terminated polyester (made by addition polymerization); and
  Copolymers which are the product of a reaction of a multifunctional isocyanate with:
    a compound monosubstituted with a group that is capable of reacting with an isocyanate, e.g. polyester;
    a compound containing two groups capable of reacting with an isocyanate (cross-linker); and/or
    a compound with at least one basic ring nitrogen and a group that is capable of reacting with an isocyanate group.

A detailed list of suitable polymeric dispersants is disclosed by MC CUTCHEON, Functional Materials, North American Edition, Glen Rock, N.J.: Manufacturing Confectioner Publishing Co., 1990, p. 110-129.

Suitable pigment stabilisers are also disclosed in DE 19636382 (BAYER), U.S. Pat. No. 5,720,802 (XEROX), U.S. Pat. No. 5,713,993 (DU PONT), WO 96/12772 (XAAR) and U.S. Pat. No. 5,085,689 (BASF).

One polymeric dispersant or a mixture of two or more polymeric dispersants may be present to improve the dispersion stability further. Sometimes surfactants can also be used as pigment dispersants, thus a combination of a polymeric dispersant with a surfactant is also possible.

The polymeric dispersant can be non-ionic, anionic or cationic in nature; salts of the ionic dispersants can also be used.

The polymeric dispersant has preferably a polymerization degree DP between 5 and 1,000, more preferably between 10 and 500 and most preferably between 10 and 100.

The polymeric dispersant has preferably a number average molecular weight Mn between 500 and 30,000, more preferably between 1,500 and 10,000.

The polymeric dispersant has preferably a weight average molecular weight Mw smaller than 100,000, more preferably smaller than 50,000 and most preferably smaller than 30,000.

The polymeric dispersant has preferably a polymeric dispersity PD smaller than 2, more preferably smaller than 1.75 and most preferably smaller than 1.5.

Commercial examples of polymeric dispersants are the following:
  DISPERBYK™ dispersants available from BYK CHEMIE GMBH;
  SOLSPERSE™ dispersants available from NOVEON;
  TEGO™ DISPERS™ dispersants from DEGUSSA;
  EDAPLAN™ dispersants from MUNZING CHEMIE;
  ETHACRYL™ dispersants from LYONDELL;
  GANEX™ dispersants from ISP;
  DISPEX™ and EFKA™ dispersants from CIBA SPECIALTY CHEMICALS INC;
  DISPONER™ dispersants from DEUCHEM; and
  JONCRYL™ dispersants from JOHNSON POLYMER.

Particularly preferred polymeric dispersants include SOLSPERSE™ dispersants from NOVEON, EFKA™ dispersants from CIBA SPECIALTY CHEMICALS INC and DISPERBYK™ dispersants from BYK CHEMIE GMBH.

Particularly preferred dispersants for UV-curable pigmented dispersions are SOLSPERSE™ 32000, 35000 and 39000 dispersants from NOVEON.

Particularly preferred dispersants for oil based pigmented dispersions are SOLSPERSE™ 11000, 11200, 13940, 16000, 17000 and 19000 from NOVEON.

The polymeric dispersant is preferably used in an amount of 2 to 600 wt %, more preferably 5 to 200 wt % based on the weight of the pigment.

Dispersion Synergists

The dispersion synergist usually consists of an anionic part and a cationic part. The anionic part of the dispersion synergist exhibiting a certain molecular similarity with the colour pigment and the cationic part of the dispersion synergist consists of one or more protons and/or cations to compensate the charge of the anionic part of the dispersion synergist.

The synergist is preferably added in a smaller amount than the polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 100:1, preferably between 2:1 and 20:1.

Suitable dispersion synergists that are commercially available include SOLSPERSE™ 5000 and SOLSPERSE™ 22000 from NOVEON.

Particular preferred pigments for the magenta ink used are a diketopyrrolo-pyrrole pigment or a quinacridone pigment. Suitable dispersion synergists include those disclosed in EP 1790698 A (AGFA GRAPHICS) and EP 1790695 A (AGFA GRAPHICS).

In dispersing C.I. Pigment Blue 15:3, the use of a sulfonated Cu-phthalocyanine dispersion synergist, e.g. SOLSPERSE™ 5000 from NOVEON is preferred. Suitable dispersion synergists for yellow inkjet inks include those disclosed in EP 1790697 A (AGFA GRAPHICS).

Dispersion Media

In one embodiment the dispersion medium consists of organic solvent(s). Suitable organic solvents include alcohols, ketones, esters, ethers, glycols and polyglycols and derivatives thereof, lactones, N-containing solvents such as amides. Preferably mixtures of one or more of these solvents are used.

Examples of suitable alcohols include methyl alcohol, ethyl alcohol, n-propyl alcohol, isopropyl alcohol, n-butyl alcohol, heptyl alcohol, octyl alcohol, cyclohexyl alcohol, benzyl alcohol, phenylethyl alcohol, phenylpropyl alcohol, furfuryl alcohol, anise alcohol and fluoroalcohols.

Examples of suitable ketones include acetone, methyl ethyl ketone, methyl n-propyl ketone, methyl isopropyl ketone, methyl n-butyl ketone, methyl isobutyl ketone, methyl n-amyl ketone, methyl isoamyl ketone, diethyl ketone, ethyl n-propyl ketone, ethyl isopropyl ketone, ethyl n-butyl ketone, ethyl isobutyl ketone, di-n-propyl ketone, diisobutyl ketone, cyclohexanone, methylcyclohexanone and isophorone, 2,4-pentanedione and hexafluoroacetone.

Examples of suitable esters include methyl acetate, ethyl acetate, n-propyl acetate, isopropyl acetate, n-butyl acetate, isobutyl acetate, hexyl acetate, octyl acetate, benzyl acetate, phenoxyethyl acetate, ethyl phenyl acetate, methyl lactate, ethyl lactate, propyl lactate, butyl lactate; methyl propionate, ethyl propionate, benzyl propionate, ethylene carbonate, propylene carbonate, amyl acetate, ethyl benzoate, butyl benzoate, butyl laurate, isopropyl myristate, isopropyl palmirate, triethyl phosphate, tributyl phosphate, diethyl phthalate, dibutyl phthalate, diethyl malonate, dipropyl malonate, diethyl succinate, dibutyl succinate, diethyl glutarate, diethyl adipate, dibutyl adipate and diethyl sebacate.

Examples of suitable ethers include butyl phenyl ether, benzyl ethyl ether, hexyl ether, diethyl ether, dipropyl ether, tetrahydrofuran and dioxane.

Examples of suitable glycols and polyglycols include ethylene glycol, diethylene glycol, triethylene glycol, propylene glycol, dipropylene glycol and tripropylene glycol.

Examples of suitable glycol and polyglycol derivatives include ethers such as alkylene glycol mono alkyl ethers, alkylene glycol dialkyl ethers, polyalkylene glycol monoalkyl ethers, polyalkylene glycol dialkyl ethers and esters of the preceding glycol ethers such as acetate and propionate esters, in case of dialkyl ethers only one ether function (resulting in mixed ether/ester) or both ether functions can be esterized (resulting in dialkyl ester).

Examples of suitable alkylene glycol mono alkyl ethers include ethylene glycol mono methyl ether, ethylene glycol mono ethyl ether, ethylene glycol mono propyl ether, ethylene glycol mono butyl ether, ethylene glycol mono hexyl ether, ethylene glycol mono 2-ethyl-hexyl ether, ethylene glycol mono phenyl ether, propylene glycol mono methyl ether, propylene glycol mono ethyl ether, propylene glycol mono n-propyl ether, propylene glycol mono n-butyl ether, propylene glycol mono iso-butyl ether, propylene glycol mono t-butyl ether and propylene glycol mono phenyl ether.

Examples of suitable alkylene glycol dialkyl ethers include ethylene glycol dimethyl ether, ethylene glycol diethyl ether, ethylene glycol methyl ethyl ether, ethylene glycol dibutyl ether, propylene glycol dimethyl ether, propylene glycol diethyl ether and propylene glycol dibutyl ether.

Examples of suitable polyalkylene glycol mono alkyl ethers include diethylene glycol mono methyl ether, diethylene glycol mono ethyl ether, diethylene glycol mono-n-propyl ether, diethylene glycol mono n-butyl ether, diethylene glycol mono hexyl ether, triethylene glycol mono methyl ether, triethylene glycol mono ethyl ether, triethylene glycol mono butyl ether, dipropylene mono methyl ether, dipropylene glycol mono ethyl ether, dipropylene glycol n-propyl ether, dipropylene glycol mono n-butyl ether, dipropylene mono t-butyl ether, tripropylene glycol mono methyl ether, tripropylene glycol mono ethyl ether, tripropylene glycol mono n-propyl ether and tripropylene glycol mono n-butyl ether.

Examples of suitable polyalkylene glycol dialkyl ethers include diethylene glycol dimethyl ether, triethylene glycol dimethyl ether, tetraethylene glycol dimethyl ether, diethylene glycol diethyl ether, triethylene glycol diethyl ether, tetraethylene glycol diethyl ether, diethylene glycol methyl ethyl ether, triethylene glycol methyl ethyl ether, tetraethylene glycol methyl ethyl ether, diethylene glycol di-n-propyl ether, diethylene glycol di-iso-propyl ether, dipropylene glycol dimethyl ether, dipropylene glycol diethyl ether, dipropylene di n-propyl ether, dipropylene di t-butyl ether, tripropylene glycol dimethyl ether and tripropylene glycol diethyl ether.

Examples of suitable glycol esters include ethylene glycol monomethyl ether acetate, ethylene glycol monoethyl ether acetate, ethylene glycol monopropyl ether acetate, ethylene glycol monobutyl ether acetate, diethylene glycol monoethyl ether acetate, diethylene glycol monobutyl ether acetate, propylene glycol monomethyl ether acetate, propylene glycol monoethyl ether acetate, dipropylene glycol monomethyl ether acetate and propylene glycol monomethyl ether propionate.

Preferred solvents for use in pigment dispersions and inkjet inks are one or more polyalkyleneglycol dialkylethers represented by the formula (PAG)

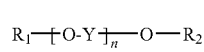

Formula (PAG)

wherein,
$R_1$ and $R_2$ are each independently selected from an alkyl group having 1 to 4 carbon atoms;
Y represents an ethylene group and/or a propylene group; wherein n is an integer selected from 4 to 20. Preferably a mixture of two or more polyalkyleneglycol dialkylethers represented by the formula (PAG).

The alkyl groups $R_1$ and $R_2$ of the polyalkyleneglycol dialkylethers according to Formula (PAG) preferably represent methyl and/or ethyl. Most preferably the alkyl groups $R_1$ and $R_2$ are both methyl groups.

In a preferred embodiment the polyalkyleneglycol dialkylethers according to Formula (PAG) are polyethylene glycol dialkylethers.

In another preferred embodiment, a mixture of 2, 3, 4 or more polyalkyleneglycol dialkylethers, more preferably polyethylene glycol dialkylethers are present in the pigment dispersion or inkjet ink.

Suitable mixtures of polyalkyleneglycol dialkylethers for the pigment dispersions include mixtures of polyethylene glycol dimethyl ethers having a molecular weight of at least 200, such as Polyglycol DME 200™, Polyglycol DME 250™ and Polyglycol DME 500™ from CLARIANT. The polyalkyleneglycol dialkylethers used in non-aqueous inkjet inks have preferably an average molecular weight between 200 and 800, and more preferably no polyalkyleneglycol dialkylethers with a molecular weight of more than 800 are present. The mixture of polyalkyleneglycol dialkylethers is preferably a homogeneous liquid mixture at room temperature.

Suitable commercial glycol ether solvents include CELLOSOLVE™ solvents and CARBITOL™ solvents from UNION CARBIDE, EKTASOLVE™ solvents from EASTMAN, DOWANOL™ solvents from DOW, OXITOLL™ solvents, Dioxitoll™ solvents, PROXITOLL™ solvents and DIPROXITOLL™ solvents from SHELL CHEMICAL and ARCOSOLV™ solvents from LYONDELL.

Lactones are compounds having a ring structure formed by ester bonds and can be of the γ-lactone (5-membered ring structure), δ-lactone (6-membered ring structure) or ε-lactone (7-membered ring structure) types. Suitable examples of lactones include γ-butyrolactone, γ-valerolactone, γ-hexalactone, γ-heptalactone, γ-octalactone, γ-nonalactone, γ-decalactone, γ-undecalactone, δ-valerolactone, δ-hexalactone, δ-heptalactone, δ-octalactone, δ-nonalactone, δ-decalactone, δ-undecalactone and ε-caprolactone.

Suitable examples of N-containing organic solvents include 2-pyrrolidone, N-methylpyrrolidone, N-ethyl-2-pyrrolidone, N-octyl-2-pyrrolidone, N-dodecyl-2-pyrrolidone, N,N-dimethylacetamid, N,N-dimethylformamid, acetonitril and N,N-dimethyldodecanamide.

In another embodiment the dispersion medium includes oil types of liquids, alone or in combination with organic solvent(s). Suitable organic solvents include alcohols, ketones, esters, ethers, glycols and polyglycols and derivatives thereof, lactones, N-containing solvents such as amides, higher fatty acid ester and mixtures of one or more of the solvents as described above for solvent based dispersion media.

The amount of polar solvent is preferably lower than the amount of oil. The organic solvent has preferably a high boiling point, preferably above 200° C. Examples of suitable combinations are disclosed by GB 2303376 (FUJITSU ISOTEC) especially for the use of oleyl alcohol and EP 1157070 A (MARCONI DATA SYSTEMS) for the combination of oil and volatile organic solvent.

Suitable oils include saturated hydrocarbons and unsaturated hydrocarbons, aromatic oils, paraffinic oils, extracted paraffinic oils, napthenic oils, extracted napthenic oils, hydrotreated light or heavy oils, vegetable oils, white oils, petroleum naphtha oils, halogen-substituted hydrocarbons, silicones and derivatives and mixtures thereof.

Hydrocarbons may be selected from straight chain or branched chain aliphatic hydrocarbons, alicyclic hydrocarbons and aromatic hydrocarbons. Examples of hydrocarbons are saturated hydrocarbons such as n-hexane, isohexane, n-nonane, isononane, dodecane and isododecane; unsaturated hydrocarbons such as 1-hexene, 1-heptene and 1-octene; cyclic saturated hydrocarbons such as cyclohexane, cycloheptane, cyclooctane, cyclodecane and decalin; cyclic unsaturated hydrocarbons such as cyclohexene, cycloheptene, cyclooctene, 1,3,5,7-cyclooctatetraene; and cyclododecene; and aromatic hydrocarbons such as benzene, toluene, xylene, naphthalene, phenanthrene, anthracene and derivatives thereof. In literature the term paraffinic oil is often used. Suitable Paraffinic oils can be normal paraffin type (octane and higher alkanes), isoparaffins (isooctane and higher isoalkanes) and cycloparaffins (cyclooctane and higher cycloalkanes) and mixtures of paraffin oils. The term "liquid paraffin" is often used to refer to a mixture of mainly including three components of a normal paraffin, an isoparaffin and a monocyclic paraffin, which is obtained by highly refining a relatively volatile lubricating oil fraction through a sulphuric-acid washing or the like, as described in U.S. Pat. No. 6,730, 153 (SAKATA INX). Suitable hydrocarbons are also described as de-aromatized petroleum distillates.

Suitable examples of halogenated hydrocarbons include methylene dichloride, chloroform, tetrachloromethane and methyl chloroform. Other suitable examples of halogen-substituted hydrocarbons include perfluoro-alkanes, fluorine-based inert liquids and fluorocarbon iodides.

Suitable examples of silicone oils include dialkyl polysiloxane (e.g., hexamethyl disiloxane, tetramethyl disiloxane, octamethyl trisiloxane, hexamethyl trisiloxane, heptamethyl trisiloxane, decamethyl tetrasiloxane, trifluoropropyl heptamethyl trisiloxane, diethyl tetramethyl disiloxane), cyclic dialkyl polysiloxane (e.g., hexamethyl cyclotrisiloxane, octamethyl cyclotetrasiloxane, tetramethyl cyclotetrasiloxane, tetra(trifluoropropyl)tetramethyl cyclotetrasiloxane), and methylphenyl silicone oil.

White oil is a term used for white mineral oils, which are highly refined mineral oils that consist of saturated aliphatic and alicyclic non-polar hydrocarbons. White oils are hydrophobic, colourless, tasteless, odourless, and do not change colour over time.

Vegetable oils include semi-drying oils such as soybean oil, cotton seed oil, sunflower oil, rape seed oil, mustard oil, sesame oil and corn oil; non-drying oils such as olive oil, peanut oil and tsubaki oil; and drying oils such as linseed oil and safflower oil, wherein these vegetable oils can be used alone or as a mixture thereof.

Examples of other suitable oils include petroleum oils, non-drying oils and semi-drying oils.

Commercially available suitable oils include the aliphatic hydrocarbons types such as the ISOPAR™ range (isoparaffins) and Varsol/Naphtha range from EXXON CHEMICAL, the SOLTROL™ range and hydrocarbons from CHEVRON PHILLIPS CHEMICAL, and the SHELLSOL™ range from SHELL CHEMICALS.

Suitable commercial normal paraffins include the NORPAR™ range from EXXON MOBIL CHEMICAL.

Suitable commercial napthenic hydrocarbons include the NAPPAR™ range from EXXON MOBIL CHEMICAL.

Suitable commercial de-aromatized petroleum distillates include the EXXSOL™ D types from EXXON MOBIL CHEMICAL.

Suitable commercial fluoro-substituted hydrocarbons include fluorocarbons from DAIKIN INDUSTRIES LTD, Chemical Division.

Suitable commercial silicone oils include the silicone fluid ranges from SHIN-ETSU CHEMICAL, Silicone Division.

Suitable commercial white oils include WITCO™ white oils from CROMPTON CORPORATION.

If the non-aqueous pigment dispersion is a curable pigment dispersion, the dispersion medium includes one or more monomers and/or oligomers to obtain a liquid dispersion medium. Sometimes, it can be advantageous to add a small amount of an organic solvent to improve the dissolution of the dispersant. The content of organic solvent should be lower than 20 wt % based on the total weight of the inkjet ink. In other cases, it can be advantageous to add a small amount of water, for example, to improve the spreading of the inkjet ink on a hydrophilic surface, but preferably the inkjet ink contains no water.

Preferred organic solvents include alcohols, aromatic hydrocarbons, ketones, esters, aliphatic hydrocarbons, higher fatty acids, carbitols, cellosolves, higher fatty acid esters. Suitable alcohols include methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

In the case of a curable inkjet ink, the dispersion medium preferably consists of monomers and/or oligomers.

Monomers and Oligomers

Any monomer or oligomer may be used as curable compound for the curable inkjet ink. A combination of monomers, oligomers and/or prepolymers may also be used. The monomers, oligomers and/or prepolymers may possess different degrees of functionality, and a mixture including combinations of mono-, di-, tri-and higher functionality monomers, oligomers and/or prepolymers may be used. The viscosity of the inkjet ink can be adjusted by varying the ratio between the monomers and oligomers.

Any method of conventional radical polymerization, photo-curing system using photo acid or photo base generator, or photo induction alternating copolymerization may be employed. In general, radical polymerization and cationic polymerization are preferred, and photo induction alternating copolymerization needing no initiator may also be employed. Furthermore, a hybrid system of combinations of these systems is also effective.

Cationic polymerization is superior in effectiveness due to lack of inhibition of the polymerization by oxygen, however it is expensive and slow, especially under conditions of high relative humidity. If cationic polymerization is used, it is preferred to use an epoxy compound together with an oxetane compound to increase the rate of polymerization. Radical polymerization is the preferred polymerization process.

Any polymerizable compound commonly known in the art may be employed. Particularly preferred for use as a radiation curable compound in the radiation curable inkjet ink are monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethyl-hexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, vinyl ether ethoxy(meth)acrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri(propylene glycol)triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerin-propoxy triacrylate, and caprolactam modified dipentaerythritol hexaacrylate, or an N-vinylamide such as, N-vinylcaprolactam or N-vinylformamide; or acrylamide or a substituted acrylamide, such as acryloylmorpholine.

Other suitable monofunctional acrylates include caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and alkoxylated cyclohexanone dimethanol acrylate.

Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other suitable trifunctional acrylates include propoxylated glycerine triacrylate and propoxylated trimethylolpropane triacrylate.

Other higher functional acrylates include di-trimethylolpropane tetraacrylate, dipentaerythritol pentaacrylate, ethoxylated pentaerythritol tetraacrylate, methoxylated glycol acrylates and acrylate esters.

Furthermore, methacrylates corresponding to the above-mentioned acrylates may be used with these acrylates. Of the methacrylates, methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and higher adhesion to an ink-receiver surface.

Furthermore, the inkjet inks may also contain polymerizable oligomers. Examples of these polymerizable oligomers include epoxy acrylates, aliphatic urethane acrylates, aromatic urethane acrylates, polyester acrylates, and straight-chained acrylic oligomers.

Suitable examples of styrene compounds are styrene, p-methylstyrene, p-methoxystyrene, β-methylstyrene, p-methyl-β-methylstyrene, α-methylstyrene and p-methoxy-β-methylstyrene.

Suitable examples of vinylnaphthalene compounds are 1-vinylnaphthalene, α-methyl-1-vinylnaphthalene, β-methyl-1-vinylnaphthalene, 4-methyl-1-vinylnaphthalene and 4-methoxy-1-vinylnaphthalene.

Suitable examples of N-vinyl compounds are N-vinylcarbazole, N-vinylpyrrolidone, N-vinylindole, N-vinylpyrrole, N-vinylphenothiazine, N-vinylacetoanilide, N-vinylethylacetoamide, N-vinylsuccinimide, N-vinylphthalimide, N-vinylcaprolactam and N-vinylimidazole.

The cationically polymerizable compound of the inkjet ink can be one or more monomers, one or more oligomers or a combination thereof.

Suitable examples of cationically curable compounds can be found in Advances in Polymer Science, 62, pages 1 to 47 (1984) by J. V. Crivello.

The cationic curable compound may contain at least one olefin, thioether, acetal, thioxane, thietane, aziridine, N-, O-, S- or P-heterocycle, aldehyde, lactam or cyclic ester group.

Examples of cationic polymerizable compounds include monomers and/or oligomers epoxides, vinyl ethers, styrenes, oxetanes, oxazolines, vinylnaphthalenes, N-vinyl heterocyclic compounds, tetrahydrofurfuryl compounds.

The cationically polymerizable monomer can be mono-, di- or multi-functional or a mixture thereof.

Suitable cationic curable compounds having at least one epoxy group are listed in the "Handbook of Epoxy Resins" by Lee and Neville, McGraw Hill Book Company, New York (1967) and in "Epoxy Resin Technology" by P. F. Bruins, John Wiley and Sons New York (1968).

Examples of cationic curable compounds having at least one epoxy group include 1,4-butanediol diglycidyl ether, 3-(bis(glycidyloxymethyl)methoxy)-1,2-propane diol, limonene oxide, 2-biphenyl glycidyl ether, 3,4-epoxycyclohexylmethyl-3',4'-epoxycyclohexane carboxylate, epichlorohydrin-bisphenol S based epoxides, epoxidized styrenics and more epichlorohydrin-bisphenol F and A based epoxides and epoxidized novolaks.

Suitable epoxy compounds including at least two epoxy groups in the molecule are alicyclic polyepoxide, polyglycidyl ester of polybasic acid, polyglycidyl ether of polyol, polyglycidyl ether of polyoxyalkylene glycol, polyglycidyl ester of aromatic polyol, polyglycidyl ether of aromatic polyol, urethane polyepoxy compound, and polyepoxy polybutadiene.

Examples of cycloaliphatic bisepoxides include copolymers of epoxides and hydroxyl components such as glycols, polyols, or vinyl ether, such as 3,4-epoxycyclohexylmethyl-3', 4'-epoxycyclohexylcarboxylate; bis(3,4-epoxycyclohexylmethyl)adipate; limonene bisepoxide; diglycidyl ester of hexahydrophthalic acid.

Examples of vinyl ethers having at least one vinyl ether group include ethyl vinyl ether, n-butyl vinyl ether, isobutyl vinyl ether, octadecyl vinyl ether, cyclohexyl vinyl ether, butanediol divinyl ether, hydroxyl butyl vinyl ether, cyclohexane dimethanol monovinyl ether, phenyl vinyl ether, p-methylphenyl vinyl ether, p-methoxyphenyl vinyl ether, α-methylphenyl vinyl ether, β-methylisobutyl vinyl ether and β-chloroisobutyl vinyl ether, diethyleneglycol divinyl ether, triethylene glycol divinyl ether, n-propyl vinyl ether, isopropyl vinyl ether, dodecyl vinyl ether, diethylene glycol monovinyl ether, cyclohexanedimethanol divinyl ether, 4-(vinyloxy)butyl benzoate, bis[4-(vinyloxy)butyl]adipate, bis[4-(vinyloxy)butyl]succinate, 4-(vinyloxy methyl)cyclohexylmethyl benzoate, bis[4-(vinyloxy)butyl]isophthalate, bis[4-(vinyloxymethyl)cyclohexylmethyl]glutarate, tris[4-(vinyloxy)butyl]trimellitate, 4-(vinyloxy)butyl steatite, bis[4-(vinyloxy)butyl]hexanediylbiscarbamate, bis[4-(vinyloxy)methyl]cyclohexyl]methyl]terephthalate, bis[4-(vinyloxy)methyl]cyclohexyl]methyl]isophthalate, bis[4-(vinyloxy)butyl](4-methyl-1,3-phenylene)-biscarbamate, bis[4-vinyloxy)butyl](methylenedi-4,1-phenylene) biscarbamate and 3-amino-1-propanol vinyl ether.

Suitable examples of oxetane compounds having at least one oxetane group include 3-ethyl-3-hydroloxymethyl-1-oxetane, the oligomeric mixture 1,4-bis[3-ethyl-3-oxetanyl methoxy)methyl]benzene, 3-ethyl-3-phenoxymethyl-oxetane, bis([1-ethyl(3-oxetanil)]methyl)ether, 3-ethyl-3-[(2-ethylhexyloxy)methyl]oxetane, 3-ethyl-[(tri-ethoxysilyl propoxy)methyl]oxetane and 3,3-dimethyl-2(p-methoxyphenyl)-oxetane.

A preferred class of monomers and oligomers which can be used in both radiation and cationically curable compositions are vinyl ether acrylates such as those described in U.S. Pat. No. 6,310,115 (AGFA), incorporated herein by reference. Particularly preferred compounds are 2-(2-vinyloxyethoxy) ethyl(meth)acrylate, most preferably the compound is 2-(2-vinyloxyethoxy)ethyl acrylate.

Initiators

The curable inkjet ink preferably also contains an initiator. The initiator typically initiates the polymerization reaction. The initiator can be a thermal initiator, but is preferably a photo-initiator. The photo-initiator requires less energy to activate than the monomers, oligomers and/or prepolymers to form the polymer. The photo-initiator suitable for use in the curable inkjet inks may be a Norrish type I initiator, a Norrish type II initiator or a photo-acid generator.

Thermal initiator(s) suitable for use in the curable inkjet ink include tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane,1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl) benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid and potassium persulfate.

The photo-initiator or photo-initiator system absorbs light and is responsible for the production of initiating species, such as free radicals and cations. Free radicals and cations are high-energy species that induce polymerization of monomers, oligomers and polymers and with polyfunctional monomers and oligomers thereby also inducing cross-linking.

Irradiation with actinic radiation may be realized in two steps by changing wavelength or intensity. In such cases it is preferred to use 2 types of photo-initiator together.

A combination of different types of initiator, for example, a photo-initiator and a thermal initiator can also be used.

A preferred Norrish type I-initiator is selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and α-halophenylglyoxalates.

A preferred Norrish type II-initiator is selected from the group consisting of benzophenones, thioxanthones, 1,2-diketones and anthraquinones. A preferred co-initiator is selected from the group consisting of an aliphatic amine, an aromatic amine and a thiol. Tertiary amines, heterocyclic thiols and 4-dialkylamino-benzoic acid are particularly preferred as co-initiator.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6trimethylbenzoyldiphenylphosphine oxide, 2-methyl-1-[4-(methylthio)phenyl]-2-morpholinopropan-1-one, 2,2-dimethoxy-1, 2-diphenylethan-1-one or 5,7-diiodo-3-butoxy-6-fluorone, diphenyliodonium fluoride and triphenylsulfonium hexafluophosphate.

Suitable commercial photo-initiators include IRGACURE™ 184, IRGACURE™ 500, IRGACURE™ 907, IRGACURE™ 369, IRGACURE™ 1700, IRGACURE™ 651, IRGACURE™ 819, IRGACURE™ 1000, IRGACURE™ 1300, IRGACURE™ 1870, DAROCUR™ 1173, DAROCUR™ 2959, DAROCUR™ 4265 and DAROCUR™ ITX available from CIBA SPECIALTY CHEMICALS, Lucerin TPO available from BASF AG, ESACURE™ KT046, ESACURE™ KIP150, ESACURE™ KT37 and Esacure™ EDB available from LAMBERTI, H-NU™ 470 and H-NU™ 470x available from SPECTRA GROUP Ltd.

Suitable cationic photo-initiators include compounds, which form aprotic acids or Bronstead acids upon exposure to ultraviolet and/or visible light sufficient to initiate polymerization. The photo-initiator used may be a single compound, a mixture of two or more active compounds, or a combination of two or more different compounds, i.e. co-initiators. Non-limiting examples of suitable cationic photo-initiators are aryldiazonium salts, diaryliodonium salts, triarylsulphonium salts, triarylselenonium salts and the like.

Suitable commercial cationic photoinitiators include R-GEN™ 1130, R-GEN™ BF-1172, R-GEN™ 261, CHIVACURE™ 1176 and Chivacure™ 1190 from Chitec Technology Co., Ltd.; IRGACURE™ 250 from Ciba Specialty Products; UV9387C and UV9380C from GE Silicones; CYRACURE™ Photoinitiator UVI-6976 and UVI-6992 from The Dow Chemical Company; OMNICAT™ series from IGM Resins, including OMNICAT 432™ (sulfonium type), OMNICAT™ 440 (iodonium type), OMNICAT™ 445 (iodonium type), OMNICAT™ 550 and OMNICAT™ 650 (polymeric type); ESACURE™ 1064, ESACURE™ 1187 and ESACURE™ 1188 from Lamberti S.p.A.; Adeka OPTOMER™ SP series of aromatic sulfonium types cationic photo-initiatiors from Adeka Corporation, e.g. Adeka OPTOMER™ SP-152; and OMPH076 from ABCR Gmbh & Co. KG, a blend of an aromatic sulfonium and aromatic thioether (available by B & S Specialties BV under the tradename Sarcat KI85).

The curable inkjet ink may contain a photo-initiator system containing one or more photo-initiators and one or more sensitizers that transfer energy to the photo-initiator(s). Suitable sensitizers include photoreducible xanthene, fluorene, benzoxanthene, benzothioxanthene, thiazine, oxazine, coumarin, pyronine, porphyrin, acridine, azo, diazo, cyanine, merocyanine, diarylmethyl, triarylmethyl, anthraquinone, phenylenediamine, benzimidazole, fluorochrome, quinoline, tetrazole, naphthol, benzidine, rhodamine, indigo and/or indanthrene dyes. The amount of the sensitizer is in general from 0.01 to 15 wt %, preferably from 0.05 to 5 wt %, based in each case on the total weight of the curable inkjet ink.

In order to increase the photosensitivity further, the curable inkjet ink may additionally contain co-initiators. For example, the combination of titanocenes and trichloromethyl-s-triazines, of titanocenes and ketoxime ethers and of acridines and trichloromethyl-s-triazines is known. A further increase in sensitivity can be achieved by adding dibenzalacetone or amino acid derivatives. The amount of co-initiator or co-initiators is in general from 0.01 to 20 wt %, preferably from 0.05 to 10 wt %, based in each case on the total weight of the curable inkjet ink.

Suitable examples of co-initiators can be categorized in 4 groups:
(1) tertiary aliphatic amines such as methyldiethanolamine, dimethylethanolamine, triethanolamine, triethylamine and N-methylmorpholine;
(2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate;
(3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate); and
(4) amides or ureas.
The preferred co-initiators are aminobenzoates.

A preferred initiator system is 2,2'-bis(o-chlorophenyl)-4,4',5,5'-tetraphenyl-(7CI,8CI) 4,4'-Bi-4H-imidazole corresponding to the chemical formula:

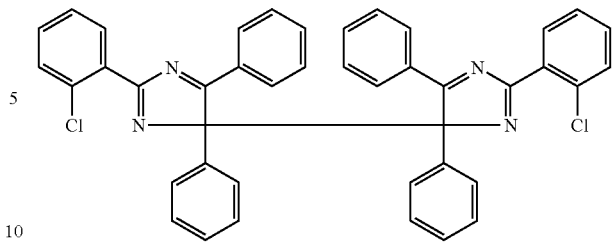

in the presence of a co-initiator such as 2-mercapto benzoxazole.

Another preferred type of initiator is an oxime ester. A suitable example has as chemical formula:

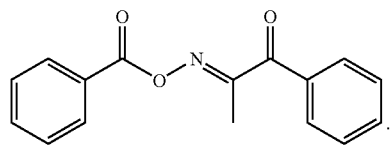 [SMILES: C/C(=N\OC(=O)c1ccccc1)C(=O)c1ccccc1 ; "."]

A preferred amount of initiator is 0.3-50 wt % of the total weight of the curable liquid, and more preferably 1-15 wt % of the total weight of the curable inkjet ink.

Irradiation with actinic radiation may be realized in two steps by changing wavelength or intensity. In such cases it is preferred to use 2 types of photo-initiator together.

Inhibitors

Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, SUMILIZER™ GA-80, SUMILIZER™ GM and SUMILIZER™ GS produced by Sumitomo Chemical Co. Ltd.; GENORAD™ 16, GENORAD™ 18 and GENORAD™ 20 from Rahn AG; IRGASTAB™ UV10 and IRGASTAB™ UV22, TINUVIN™ 460 and CGS20 from Ciba Specialty Chemicals; FLOORSTAB™ UV range (UV-1, UV-2, UV-5 and UV-8) from Kromachem Ltd, ADDITOL™ S range (S100, S110, S120 and S130) from Cytec Surface Specialties.

However, most preferably the inhibitor is a polymerizable inhibitor.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total ink.

Surfactants

The surfactant(s) can be anionic, cationic, non-ionic, or zwitter-ionic and are usually added in a total quantity less than 20 wt % based on the total weight of the inkjet ink and particularly in a total less than 10 wt % based on the total weight of the inkjet ink.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

For non-aqueous inkjet inks preferred surfactants are selected from fluoro surfactants (such as fluorinated hydrocarbons) and silicone surfactants. The silicones are typically siloxanes and can be alkoxylated, polyether modified, polyether modified hydroxy functional, amine modified, epoxy modified and other modifications or combinations thereof. Preferred siloxanes are polymeric, for example polydimethylsiloxanes.

In radiation curable inkjet inks a fluorinated or silicone compound may be used as a surfactant, however, a cross-linkable surfactant would be preferred. It is therefore preferred to use a copolymerizable monomer having surface-active effects, for example, polyacrylate copolymers, silicone modified acrylates, silicone modified methacrylates, acrylated siloxanes, polyether modified acrylic modified siloxanes, fluorinated acrylates, and fluorinated methacrylates; these acrylates can be mono-, di-, tri- or higher functional (meth)acrylates.

Surfactants are known for use in inkjet inks to reduce the surface tension of the ink and to reduce the contact angle on the substrate, i.e. to improve the wetting of the substrate by the ink. On the other hand, the jettable fluid must meet stringent performance criteria in order to be adequately jettable with high precision, reliability and during an extended period of time. To achieve both wetting of the substrate by the ink and high jetting performance, typically, the surface tension of the ink is reduced by the addition of one or more surfactants. In the case of curable inkjet inks, however, the surface tension of the inkjet ink is not only determined by the amount and type of surfactant, but also by the polymerizable compounds, the polymeric dispersants and other additives in the ink composition.

Depending upon the application a surfactant can be used with a high, low or intermediate dynamic surface tension. Silicone surfactants are generally known to have low dynamic surface tensions while fluorinated surfactants are known to have higher dynamic surface tensions.

Useful commercially available fluorinated surfactants are for example the ZONYL™ range of fluoro-surfactants from DUPONT and the FLUORAD™ range of fluoro-surfactants from 3M. Other fluorinated surfactants are e.g. described in EP 1412438 A (3M).

Silicone surfactants are often preferred in curable inkjet inks, especially the reactive silicone surfactants, which are able to be polymerized together with the polymerizable compounds during the curing step.

Useful commercially available silicone surfactants are often polysiloxane surfactants, especially polyether modified polysiloxanes, preferably with one or more acrylate function in order to become polymerizable.

Examples of useful commercial silicone surfactants are those supplied by BYK CHEMIE GMBH (including BYK™-302, 307, 310, 331, 333, 341, 345, 346, 347, 348, UV3500, UV3510 and UV3530), those supplied by TEGO CHEMIE SERVICE (including TEGO RAD™ 2100, 2200N, 2250, 2300, 2500, 2600 and 2700), EBECRYL™ 1360 a polysilixone hexaacrylate from CYTEC INDUSTRIES BV and EFKA™-3000 series (including EFKA™-3232 and EFKA™-3883) from EFKA CHEMICALS B.V.

Binders

The inkjet inks of the inkjet ink set according to a preferred embodiment of the present invention may include a binder resin. The binder functions as a viscosity controlling agent and also provides fixability relative to a substrate, e.g. a polyvinyl chloride substrate. The binder preferably has a good solubility in the solvent(s).

Non-aqueous inkjet ink compositions preferably include a binder resin. The binder functions as a viscosity controlling agent and also provides fixability relative to the polymeric resin substrate, e.g. a polyvinyl chloride substrate, also called vinyl substrate. The binder must be selected to have a good solubility in the solvent(s).

Suitable examples of binder resins include acrylic resins, modified acrylic resins, styrene acrylic resins, acrylic copolymers, acrylate resins, aldehyde resins, rosins, rosin esters, modified rosins and modified rosin resins, acetyl polymers, acetal resins such as polyvinyl butyral, ketone resins, phenolic resins and modified phenolic resins, maleic resins and modified maleic resins, terpene resins, polyester resins, polyamide resins, polyurethane resins, epoxy resins, vinyl resins, vinyl chloride-vinyl acetate copolymer resins, cellulose type resins such as nitro cellulose, cellulose acetopropionate and cellulose acetate butyrate, and vinyl toluene-α-methylstyrene copolymer resin. These binders may be used alone or in a mixture thereof. The binder is preferably a film-forming thermoplastic resin.

The amount of binder resin in inkjet ink is preferably in the range of 0.1 to 30 wt %, more preferably 1 to 20 wt %, most preferably 2 to 10 wt % based on the total weight of the inkjet ink.

Humectants

If the inkjet inks contain organic solvents or water, preferably at least one humectant is present in the inks to prevent the clogging of the nozzle, due to its ability to slow down the evaporation rate of ink.

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are triethylene glycol mono butylether, glycerol and 1,2-hexanediol. The humectant is preferably added to the inkjet ink formulation in an amount of 0.1 to 40 wt % of the formulation, more preferably 0.1 to 10 wt % of the formulation, and most preferably approximately 4.0 to 6.0 wt %.

Other Additives

The inkjet inks of the inkjet ink set according to a preferred embodiment of the present invention may include other additives such as buffering agents, anti-mold agents, pH adjustment agents, electric conductivity adjustment agents, chelating agents, anti-rusting agents, light stabilizers, dendrimers, polymers, cross-linking agents, soluble electrolytes as conductivity aid, sequestering agents and chelating agents, compounds to introduce additional security features and the like. Such additives may be included in the colour inkjet inks of the inkjet ink set according to a preferred embodiment of the present invention in any effective amount, as desired.

Compounds to introduce additional security features include a fluorescent compound, a phosphorescent compound, a thermochromic compound, an iridescent compound and a magnetic particle. Suitable UV-fluorescent and phosphorescent compounds include LUMILUX™ luminescent pigments from HONEYWELL, UVITEX™ OB from CIBA-GEIGY, KEYFLUOR™ dyes and pigments from KEYSTONE and fluorescent dyes from SYNTHEGEN.

The colour inkjet inks of the inkjet ink set according to a preferred embodiment of the present invention may further include conducting or semi-conducting polymers, such as polyanilines, polypyrroles, polythiophenes such as poly(ethylenedioxythiophene) (PEDOT), substituted or unsubstituted poly(phenylenevinylenes) (PPV's) such as PPV and MEH-PPV, polyfluorenes such as PF6, etc.

Preparation of Pigmented Inkjet Inks

The average particle size and distribution is an important feature for inkjet inks. The inkjet ink may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can include particles, preferably substantially spherical in shape, e.g. beads consisting essentially of a polymeric resin or yttrium stabilized zirconium oxide beads.

In the process of mixing, milling and dispersion, each process is performed with cooling to prevent build up of heat, and for radiation curable inkjet inks as much as possible under light conditions in which actinic radiation has been substantially excluded.

The inkjet ink may contain more than one pigment, the inkjet ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture include the mill grind and the milling media. The mill grind includes pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, selected mechanical device and residence conditions, the initial and desired final particle size, etc. In a preferred embodiment of the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make the inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

Examples

Materials

All materials used in the following examples were readily available from standard sources such as Aldrich Chemical Co. (Belgium) and Acros (Belgium) unless otherwise specified.

PV19 is an abbreviation used for HOSTAPERM™ Red E5B 02, a C.I. Pigment violet 19 from CLARIANT.

PB15:3 (A) is an abbreviation used for Hostaperm Blue B4G, a C.I. Pigment Blue 15:3 pigment from CLARIANT.

PB15:3 (B) is an abbreviation used for SUNFAST™ Blue 249-1284, a C.I. Pigment Blue 15:3 pigment from SUN CHEMICAL.

PY150 is an abbreviation used for CHROMOPHTAL™ Yellow LA, a C.I. Pigment Yellow 150 from CIBA SPECIALTY CHEMICALS.

PBlack7 is SPECIAL BLACK™ 550, a carbon black available from DEGUSSA

TR52 is TIOXIDE TR 52™, a surface modified titanium dioxide from HUNTSMAN CHEMICAL GROUP.

SOLSPERSE™ 35000, a polyethyleneimine-polyester hyperdispersant from NOVEON.

S39000 is an abbreviation for SOLSPERSE™ 39000, a polyethyleneimine-polyester hyperdispersant from NOVEON.

S5000 is an abbreviation for SOLSPERSE™ 5000 is a sulfonated copper phthalocyanine dispersion synergist from NOVEON.

SOLSPERSE™36000 is a polymeric dispersant for $TiO_2$ from NOVEON.

Genorad™ 16 is a polymerization inhibitor from RAHN AG.

DPGDA is dipropyleneglycoldiacrylate from SARTOMER.

SR9003 is an abbreviation for SARTOMER™ SR9003, a propoxylated neopentyl glycol diacrylate monomer available from SARTOMER.

VEEA is 2-(2-vinyloxyethoxy)ethyl acrylate from NIPPON SHOKUBAI.

IBOA is isobornylacrylate available as Sartomer 506D from SARTOMER.

TMPTA is Trimethylolpropane Triacrylate available as SR351 from SARTOMER.

ESACURE™ KTO46 is a mixture of trimethylbenzoyldiphenylphosphine oxide, alfa-hydroxyketone en benzophenone derivatives available from FRATELLI LAMBERTI SPA.

DAROCUR™ TPO is 2,4,6-trimethylbenzoyl-diphenylphosphineoxide from CIBA SPECIALTY CHEMICALS.

GENOCURE™ EPD is ethyl 4-dimethylaminobenzoate from RAHN AG.

GENOCURE™ TPO is 2,4,6-trimethylbenzoyl-diphenylphosphineoxide from RAHN AG.

DAROCUR™ ITX is an isomeric mixture of 2- and 4-isopropylthioxanthone from CIBA SPECIALTY CHEMICALS.

EBECRYL™ 350 is a polysilioxane diacrylate from CYTEC INDUSTRIES BV.

EBECRYL™ 1360 is a polysiloxane hexaacrylate from CYTEC INDUSTRIES BV.

EBESOL is a 30% solution of EBECRYL™ 1360 in VEEA.

TEGOGLIDE™ 410 is a polysiloxan polyether copolymer from GOLDSCHMIDT.

TEGOSOL is a 30% solution of TEGOGLIDE™ 410 in IBOA.

GENVEEA is a 50% solution of GENORAD™ 16 in VEEA.

GENIBOA is a 50% solution of GENORAD™ 16 in IBOA.

Black PET is an AGFA IDEALINE™ Silver Film RPF (Red Phototooling Film) which was exposed and developed to maximum density of 4.2 to 4.5 as measured with a MACBETH™ TD908 without any filter.

Measurement Methods

1. Measurement of TURBISCAN™ Stability Index

A vial with a sample of 20 mL of ink was measured at 20° C. using a sedimentometer TURBISCAN™ LabExpert in combination with TURBISCAN™ Easysoft (manufactured by FORMULACTION, France) that can evaluate the settling properties from intensity distributions of back scattered light and transmitted light in the height direction of a sample. Backscattering and transmission were measured at 880 nm at the top 30 mm of the vial during 13 days. A TURBISCAN™ Stability Index is calculated wherein a higher value corresponds with a less stable ink.

2. Average Particle Size of Concentrated Pigment Dispersion (Malvern)

The average particle size of pigment particles in concentrated pigment dispersions was determined by photon correlation spectroscopy at a wavelength of 633 nm with a 4 mW HeNe laser on a diluted sample of the pigmented inkjet ink. The particle size analyzer used was a MALVERN™ nano-S available from Goffin-Meyvis.

The sample was prepared by addition of one drop of ink to a cuvet containing 1.5 mL ethyl acetate and mixed until a homogenous sample was obtained. The measured particle size is the average value of 3 consecutive measurements consisting of 6 runs of 20 seconds.

3. Average Particle Size of Inkjet Ink (BI90)

The average particle size of pigment particles in a non-aqueous inkjet ink was determined with a Brookhaven Instruments Particle Sizer BI90plus based upon the principle of dynamic light scattering. The ink or dispersion was diluted with ethyl acetate to a pigment concentration of 0.002 wt %. The measurement settings of the BI90plus were: 5 runs at 23° C., angle of 90°, wavelength of 635 nm and graphics=correction function.

For good inkjet characteristics (jetting characteristics and print quality) the average particle size of the dispersed particles in a colour inkjet ink should be less than 200 nm, preferably less than 150 nm.

4. Viscosity

The viscosity of the white inkjet inks was measured using a Brookfield DV-II+ viscometer at 40° C. at 12 rotations per minute (RPM) using a CPE 40 spindle, which measurement corresponds to a viscosity measured at 40° C. at a shear rate of 90 s$^{-1}$.

5. Surface Energy of the Substrates

The Owens-Wendt equation was used for calculating the surface energy of a substrate $\sigma_s$ in the same manner as disclosed in US 2005190245 (AGFA).

6. Surface Tension of Inks

The surface tension of the inkjet inks was measured with a KRÜSS tensiometer K9 at 25° C. after 60 seconds.

7. Measurement of CieL*a*b* Parameters

Printed samples were measured with a spectrophotometer (Gretag SPM50) to determine the coordinates of the L*a*b* colours system of the colour difference indication method specified in CIE (Commission International de l'Eclairage). In this case, the measurement was carried out under conditions of light source D50, provision of no light source filter, absolute white as reference white, and angle of visibility 2°.

Example 1

This example illustrates how sedimentation problems in inkjet printing can be strongly reduced by using higher concentrations of TiO$_2$ in a white inkjet ink and by adjusting the temperature of the white ink in function of its demand for printing.

Preparation of White Pigment Dispersion

Concentrated white pigment dispersions W1 and W2 were prepared according to Table 3.

TABLE 3

| wt % of: | W1 | W2 |
|---|---|---|
| TR52 | 50.0 | 50.0 |
| SOLSPERSE ™ 36000 | 10.0 | 10.0 |
| GENORAD ™ 16 | 1.0 | 1.0 |
| VEEA | 39.0 | — |
| IBOA | — | 39.0 |

The concentrated pigment dispersion W1 was made by mixing 500.0 g of the white pigment TR52, 20.0 g of a 50% solution of the inhibitor GENORAD™ 16 in VEEA and 333.3 g of a 30% solution of the polymeric dispersant Solsperse™ 36000 in VEEA for 30 minutes using a DISPERLUX™ Laboratory Dissolver YELLOW075 from DISPERLUX S.A.R.L., Luxembourg. This mixture was subsequently milled in an Eiger Lab Bead mill (from EIGER TORRANCE Ltd.) using yttrium-stabilized zirconium oxide-beads of 1-1.6 mm diameter ("high wear resistant zirconia grinding media" from TOSOH Co.). The bead mill is filled for 52% with the grinding beads and water-cooled during milling at 1500 rpm for 5 minutes. The concentrated pigment dispersion W1 had an average particles size of 317 nm measured with a MALVERN™ nano-S particle size analyzer.

The concentrated pigment dispersion W2 was made by mixing 500.0 g of the white pigment TR52, 20.0 g of a 50% solution of the inhibitor GENORAD™ 16 in IBOA and 333.3 g of a 30% solution of the polymeric dispersant SOLSPERSE™ 36000 in IBOA for 30 minutes using a KOTHOFF MS1 dispersion system of Hans Kothoff, Apparate- and Maschinenbau, Rodenkirchen, Germany. The concentrated pigment dispersion W1 had an average particles size of 335 nm measured with a MALVERN™ nano-S particle size analyzer.

Preparation of White Inkjet Inks

Curable white inkjet inks INK-1 to INK-6 were prepared from the concentrated pigment dispersion W1 and W2 by adding the remaining components under stirring at 20° C. to obtain a composition as shown in Table 4.

TABLE 4

| wt % of | INK-1 | INK-2 | INK-3 | INK-4 | INK-5 | INK-6 |
|---|---|---|---|---|---|---|
| W1 | 34.0 | 51.0 | 68.0 | — | — | — |
| W2 | — | — | — | 34.0 | 51.0 | 68.0 |
| IBOA | — | — | — | 53.7 | 36.7 | 19.7 |
| VEEA | 26.9 | 13.9 | 0.8 | — | — | — |
| TMPTA | 26.8 | 22.8 | 18.9 | — | — | — |
| ESACURE ™ KTO46 | 10.0 | 10.0 | 10.0 | 10.0 | 10.0 | 10.0 |
| EBESOL | 1.0 | 1.0 | 1.0 | — | — | — |
| TEGOSOL | — | — | — | 1.0 | 1.0 | 1.0 |
| GENVEEA | 1.3 | 1.3 | 1.3 | — | — | — |
| GENIBOA | — | — | — | 1.3 | 1.3 | 1.3 |

Evaluation

The viscosity of the inkjet inks INK-1 to INK-6 was measured at 40° C. using a Brookfield DV-II+ viscometer and is listed in Table 5. It can be observed that the viscosity increases with an increasing content of TiO$_2$.

TABLE 5

| Ink | wt % of TiO$_2$ | Viscosity (mPa · s) |
|---|---|---|
| INK-1 | 17 | 11 |
| INK-2 | 26 | 16 |
| INK-3 | 34 | 20 |
| INK-4 | 17 | 11 |
| INK-5 | 26 | 16 |
| INK-6 | 34 | 24 |

The viscosity of the inks INK-2, INK-3, INK-5 and INK-6 can be reduced by increasing the temperature of the ink.

TABLE 6

| Temperature | Viscosity (mPa · s) | | | |
|---|---|---|---|---|
| | INK-2 | INK-3 | INK-5 | INK-6 |
| 40° C. | 16 | 20 | 16 | 24 |
| 50° C. | 12 | — | 12 | — |
| 55° C. | 11 | 15 | 11 | — |
| 60° C. | — | 11 | — | 14 |
| 65° C. | — | — | — | 12 |

The sedimentometer TURBISCAN™ LabExpert was used to determine the sedimentation speed. From Table 7, it is clear that the more concentrated inks INK-2, INK-3, INK-5 and INK-6 exhibited a smaller value for the Turbiscan Stability Index and hence were thus much more stable.

TABLE 7

| Ink | Turbiscan Stability index |
|---|---|
| INK-1 | 13 |
| INK-2 | 5 |
| INK-3 | 6 |
| INK-4 | 19 |
| INK-5 | 10 |
| INK-6 | 10 |

Preparation and Coating of White Ink-Mixtures

The inkjet inks INK-2 and INK-3, respectively inkjet inks INK-5 and INK-6, were diluted with monomers, surfactants, photoinitiators and stabilizer in order to obtain the same composition as inkjet ink INK-1, respectively inkjet ink INK-4, thus allowing a fair comparison between the inks at an equal content of 17 wt % of TiO2 based upon the total weight of the ink.

For simulating sedimentation conditions in a printer, the white ink-mixtures mentioned above were prepared after 1 hour, 6 hours, 24 hours, 1 week, 2 weeks and 9 weeks of unstirred storage at room temperature, by taking samples with a pipette at the top of the containers of the inks INK-2 and INK-3 and INK-5 and INK-6 and subsequently diluting them with the other components under stirring them for 5 minutes. Samples of INK-1 and INK-4 were also taken with a pipette at the top of their container after 1 hour, 6 hours, 24 hours, 1 week, 2 weeks and 9 weeks of unstirred storage at room temperature, and then stirred for 5 minutes before testing.

The inkjet inks INK-1, INK-4 and the white ink-mixtures were each coated on a substrate Black PET using a bar coater and a 10 μm wired bar. Each coated layer was cured using a Fusion DRSE-120 conveyer, equipped with a Fusion VPS/I600 lamp (D-bulb), which transported the samples under the UV lamp on a conveyer belt at a speed of 20 m/min.

The lightness values of the coated white layers were determined and are listed in Table 8.

TABLE 8

| After storage at 20° C. for: | Lightness value L for white ink: | | | | | |
|---|---|---|---|---|---|---|
| | INK-1 | Diluted INK-2 | Diluted INK-3 | INK-4 | Diluted INK-5 | Diluted INK-6 |
| 1 hour | 67 | 67 | 67 | 63 | 68 | 68 |
| 6 hours | 65 | 68 | 69 | 63 | 67 | 66 |
| 24 hours | 66 | 68 | 69 | 63 | 66 | 65 |
| 1 week | 45 | 60 | 67 | 57 | 64 | 69 |
| 2 weeks | 12 | 24 | 64 | 47 | 52 | 66 |
| 9 weeks | 10 | 31 | 57 | 13 | 47 | 52 |

Table 8 illustrates that the white ink-mixtures diluted after more than one week of storage in an inkjet printer from the higher concentrated inks INK-2 and INK-3, respectively INK-5 and INK-6, still exhibited good image quality, while the inkjet inks INK-1 and INK-4 were already deteriorating rapidly.

The undiluted inkjet inks INK-2, INK-3, INK-5 and INK-6 were coated and cured in the same manner as above, and compared with inkjet inks INK-1 and INK-4. The CieL*a*b* parameters were determined for all coated inks INK-1 to INK-6, as well as for the uncoated Black PET substrate (No ink). Another advantage that became apparent from the Cielab measurements of Table 9, is that for reaching a certain level of opacity less white ink is needed. Thinner layers are not only economically interesting, but exhibit different physical properties, such as higher flexibility.

TABLE 9

| CieL*a*b* parameter | No ink | INK-1 | INK-2 | INK-3 | INK-4 | INK-5 | INK-6 |
|---|---|---|---|---|---|---|---|
| L* | 9 | 68 | 75 | 77 | 63 | 72 | 74 |
| a* | 1.7 | −3.1 | −3.0 | −3.0 | −3.6 | −3.3 | −3.1 |
| b* | 1.2 | −5.4 | −5.2 | −5.4 | −7.4 | −6.0 | −5.6 |

Example 2

This example shows an inkjet ink set which has been optimized for jetting with Nova 256/80 AAA printheads (available from FUJIFILM DIMATIX) at a jetting temperature of 40° C.

Printheads in inkjet printers are normally all operated at the same temperature, which simplifies not only the requirements for a temperature control system, but also results in a better image quality in radiation curable inkjet printing since the curing speed is influenced by differences in ink temperature.

The multi-density inkjet ink set consists of a neutral black ink (K), a magenta (M) and a light magenta (LM) ink, a cyan (C) and a light cyan (LC) ink and a yellow ink (Y) composed as shown in Table 10 and the white inkjet ink INK-3 (composition see Example 1).

TABLE 10

| in wt % of ink | K | M | LM | C | LC | Y |
|---|---|---|---|---|---|---|
| DPGDA | 60.92 | 60.80 | 32.94 | 23.79 | 33.36 | 41.20 |
| SR9003 | 20.00 | 20.00 | 50.00 | 60.00 | 50.00 | 41.40 |
| PBlack7 | 1.54 | — | — | — | — | — |
| PV19 | 0.55 | 3.60 | 0.51 | — | — | — |
| PB15:3 (A) | 0.55 | — | — | — | — | — |
| PB15:3 (B) | — | — | — | 1.17 | 0.17 | — |
| PY150 | — | — | — | — | — | 1.80 |
| S39000 | 2.64 | 1.80 | 0.25 | 1.17 | 0.17 | 1.80 |
| S 5000 | — | — | — | 0.06 | 0.01 | — |
| DAROCUR ™ ITX | 5.00 | 5.00 | — | 5.00 | — | 5.00 |
| DAROCUR ™ TPO | — | — | 10.00 | — | 10.00 | — |
| GENOCURE ™ EPD | 7.50 | 7.50 | 5.00 | 7.50 | 5.00 | 7.50 |
| EBECRYL ™ 350 | 0.30 | 0.30 | 0.30 | 0.30 | 0.30 | 0.30 |
| GENORAD ™ 16 | 1.00 | 1.00 | 1.00 | 1.00 | 1.00 | 1.00 |
| viscosity at 40° C. (mPa · s) | 11 | 12 | 11 | 10 | 10 | 10 |
| surface tension at 25° C. (mN/m) | 24.2 | 24.0 | 24.0 | 24.5 | 24.2 | 24.1 |

The dispersion quality of colour pigments in inkjet inks tend to deteriorate when the ink is kept at higher temperatures for a long period. The average particle size of the inks in the inkjet ink set of Table 10 was determined after preparation and again after a heat treatment of one week at 80° C. The results are given in Table 11.

TABLE 11

| Measured after | Average particle size in nm (BI90) | | | | | |
|---|---|---|---|---|---|---|
| | K | M | LM | C | LC | Y |
| preparation | 134 | 140 | 134 | 103 | 103 | 202 |
| 1 week at 80° C. | 230 | 291 | 209 | 112 | 109 | 204 |

From Table 11, it is clear that particularly the dispersion stability of the black and the magenta inkjet inks of this ink set suffer from prolonged storage at higher temperature. Therefore, these colour inks are preferably used with printheads operating at a lower temperature, e.g. 40° C. In order to obtain reduced sedimentation problems with the white inkjet ink, it becomes necessary to jet the white inkjet ink at a higher temperature of about 60° C. (see Table 6) because viscosity plays an important role in the jetting performance of an inkjet ink.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An inkjet printing method comprising the steps of:
providing a white inkjet ink and at least one color inkjet ink to an inkjet printer; and
jetting the white inkjet ink at a temperature higher than a temperature of the at least one color inkjet ink onto an ink-receiver; wherein
a difference in jetting temperature between the white inkjet ink and the at least one color inkjet ink is at least 5° C.; and
further comprising the step of reducing the temperature of the white ink in a printhead by at least 5° C. when printing images not requiring the white inkjet ink or when the inkjet printer is not used for more than 24 hours.

2. The inkjet printing method according to claim 1, wherein a temperature of a printhead including the at least one color inkjet ink remains at its jetting temperature.

3. The inkjet printing method according to claim 1, further comprising the step of surface printing or backing printing of the white inkjet ink on a transparent or translucent substrate in order to form a reflection image.

4. The inkjet printing method according to claim 1, wherein the at least one color inkjet ink is jetted on a partially cured layer of the white inkjet ink.

5. The inkjet printing method according to claim 1, wherein the white inkjet ink includes a pigment with a refractive index greater than 1.60.

6. The inkjet printing method according to claim 5, wherein the pigment with a refractive index greater than 1.60 is titanium dioxide.

7. The inkjet printing method according to claim 6, wherein an average particle size of the titanium dioxide measured with photon correlation spectroscopy at a wavelength of 633 nm is between 0.2 μm and 0.5 μm.

8. The inkjet printing method according to claim 1, wherein the white inkjet ink includes at least 26 wt % of a white pigment based upon a total weight of the white inkjet ink.

9. The inkjet printing method according to claim 1, further comprising the step of curing the white inkjet ink by heat, radiation, and/or electron beam.

10. The inkjet printing method according to claim 1, wherein the white inkjet ink includes a polymerizable compound selected from the group consisting of isobornylacrylate, phenoxyethyl acrylate, tetrahydrofurfuryl acrylate 2-(2-vinyloxyethoxy)ethyl(meth)acrylate, and N-vinylcaprolactam.

11. An inkjet printing method comprising the steps of:
providing a white inkjet ink and at least one color inkjet ink to an inkjet printer; and
jetting the white inkjet ink at a temperature higher than a temperature of the at least one color inkjet ink onto an ink-receiver; wherein
a difference in jetting temperature between the white inkjet ink and the at least one color inkjet ink is at least 5° C.; and
a viscosity of the white inkjet ink is at least 4 mPa·s greater than a viscosity of the at least one color inkjet ink when the viscosity is measured at 40° C. with a Brookfield DV-II+Pro at 12 rotations per minute.

12. The inkjet printing method according to claim 11, wherein a temperature of a printhead including the at least one color inkjet ink remains at its jetting temperature.

13. The inkjet printing method according to claim 11, further comprising the step of surface printing or backing printing of the white inkjet ink on a transparent or translucent substrate in order to form a reflection image.

14. The inkjet printing method according to claim 11, wherein the at least one color inkjet ink is jetted on a partially cured layer of the white inkjet ink.

15. The inkjet printing method according to claim 11, wherein the white inkjet ink includes a pigment with a refractive index greater than 1.60.

16. The inkjet printing method according to claim 15, wherein the pigment with a refractive index greater than 1.60 is titanium dioxide.

17. The inkjet printing method according to claim 16, wherein an average particle size of the titanium dioxide measured with photon correlation spectroscopy at a wavelength of 633 nm is between 0.2 μm and 0.5 μm.

18. The inkjet printing method according to claim 11, wherein the white inkjet ink includes at least 26 wt % of a white pigment based upon a total weight of the white inkjet ink.

19. The inkjet printing method according to claim 11, further comprising the step of curing the white inkjet ink by heat, radiation, and/or electron beam.

20. The inkjet printing method according to claim 11, wherein the white inkjet ink includes a polymerizable compound selected from the group consisting of isobornylacrylate, phenoxyethyl acrylate, tetrahydrofurfuryl acrylate, 2-(2-vinyloxyethoxy)ethyl(meth)acrylate, and N-vinylcaprolactam.

* * * * *